United States Patent [19]

Romano et al.

[11] Patent Number: 5,991,595

[45] Date of Patent: Nov. 23, 1999

[54] COMPUTERIZED SYSTEM FOR SCORING CONSTRUCTED RESPONSES AND METHODS FOR TRAINING, MONITORING, AND EVALUATING HUMAN RATER'S SCORING OF CONSTRUCTED RESPONSES

[75] Inventors: Frank J. Romano, Yardville, N.J.; Mark Grant, New Hope, Pa.; Marisa D. Farnum, Princeton, N.J.

[73] Assignee: Educational Testing Service, Princeton, N.J.

[21] Appl. No.: 09/045,621

[22] Filed: Mar. 20, 1998

Related U.S. Application Data

[60] Provisional application No. 60/044,319, Mar. 21, 1997.

[51] Int. Cl.[6] .............................. G09B 3/00; G09B 7/00
[52] U.S. Cl. ........................ 434/353; 434/118; 434/322; 434/350; 382/321
[58] Field of Search ...................................... 434/118, 156, 434/157, 169, 307 R, 308, 322, 323, 327, 347, 350, 353, 362; 358/450; 704/10; 706/45, 927; 707/104, 500, 501, 512; 382/10, 48, 321; 273/429–432; 345/302, 348

[56] References Cited

U.S. PATENT DOCUMENTS

| | | |
|---|---|---|
| 4,671,772 | 6/1987 | Slade et al. . |
| 4,768,087 | 8/1988 | Taub et al. . |
| 4,867,685 | 9/1989 | Brush et al. . |
| 4,895,518 | 1/1990 | Arnold et al. ....................... 434/350 X |
| 4,953,209 | 8/1990 | Ryder, Sr. et al. . |
| 4,978,305 | 12/1990 | Kraft ....................................... 434/353 |
| 5,002,491 | 3/1991 | Abrahamson et al. . |
| 5,011,413 | 4/1991 | Ferris et al. . |
| 5,033,969 | 7/1991 | Kamimura . |
| 5,059,127 | 10/1991 | Lewis et al. ............................ 434/353 |

(List continued on next page.)

FOREIGN PATENT DOCUMENTS

WO 95/15654   6/1995   WIPO .

OTHER PUBLICATIONS

"The Integrated Instructional Systems Report", Feb., 1990, EPIE Institute.

Results of literature search re: new products and educational/psychological academic literature performed by Educational Testing Service on Jul. 29, 1992, using various commercial databases.

"The MicroCAT Testing System", 1992 Computerized Testing Products Catalog, Assessment Systems Corporation, 1992.

Wayne Patience, "Software Review–MicroCAT Testing System Version 3.0", Journal of Educational Measurement/ Spring 1990, vol. 27, No. 1, pp. 82–88.

G. Gage Kingsbury, "Adapting Adaptive Testing: Using the MicroCat Testing System in a Local School District", Educational Measurement: Issues and Practice, Summer, 1990, pp. 3–6 and 29.

(List continued on next page.)

*Primary Examiner*—Joe H. Cheng
*Attorney, Agent, or Firm*—Woodcock Washburn Kurtz Mackiewicz & Norris LLP

[57] ABSTRACT

Systems and methods for presentation to raters of constructed responses to test questions in electronic workfolders. The systems and methods provide for selection and designation of constructed responses into categories for use in quality control functions and training applications. A storage device is used to relationally store data regarding the raters, the constructed responses, and the scores awarded for use in selecting constructed responses for use in quality control and training. The system also comprises rater stations and processing systems for selectively transmitting constructed responses to the rater stations and receiving scores awarded by the raters assigned to the rater stations during both training and actual production scoring. The system further comprises rater stations and processing systems for displaying rater performance data, topic performance data, constructed response volume data, and candidate sample volume data.

42 Claims, 32 Drawing Sheets

U.S. PATENT DOCUMENTS

| | | |
|---|---|---|
| 5,170,362 | 12/1992 | Greenberg et al. . |
| 5,176,520 | 1/1993 | Hamilton . |
| 5,180,309 | 1/1993 | Egnor . |
| 5,195,033 | 3/1993 | Samph et al. . |
| 5,204,813 | 4/1993 | Samph et al. ................... 434/350 X |
| 5,211,563 | 5/1993 | Haga et al. . |
| 5,211,564 | 5/1993 | Martinez et al. . |
| 5,247,670 | 9/1993 | Matsunaga . |
| 5,287,519 | 2/1994 | Dayan et al. ...................... 395/700 |
| 5,309,564 | 5/1994 | Bradley et al. ................... 395/200 |
| 5,318,450 | 6/1994 | Carver ................................ 434/336 |
| 5,321,611 | 6/1994 | Clark et al. ....................... 434/353 |
| 5,432,932 | 7/1995 | Chen et al. ........................ 395/650 |
| 5,433,615 | 7/1995 | Clarke et al. ..................... 358/450 |
| 5,437,554 | 8/1995 | Clark et al. ................... 706/927 X |
| 5,442,759 | 8/1995 | Chiang et al. ................ 434/118 X |
| 5,458,493 | 10/1995 | Clark et al. ................... 434/118 X |
| 5,466,159 | 11/1995 | Clark et al. ................... 434/362 X |
| 5,509,127 | 4/1996 | Datuyler et al. .................. 395/308 |
| 5,513,994 | 5/1996 | Kershaw et al. .................. 434/350 |
| 5,524,193 | 6/1996 | Covington et al. ............... 707/512 |
| 5,558,521 | 9/1996 | Clark et al. ....................... 434/322 |
| 5,565,316 | 10/1996 | Kershaw et al. .............. 706/927 X |

OTHER PUBLICATIONS

Anthony DePalma, "Standardized College Exam Is Customized by Computers", The New York Times, Front Page Story, Mar. 21, 1992.

ETS/ACCESS Summer 1992 Special Edition Newsletter.

Elliot Soloway, "Quick, Where Do the Computers Go; Computers in Education", Communications of the ACM, Association for Computing, Machinery, 1991, Feb., 1991, vol. 34, No. 2, p. 29.

Tse–chi Hsu and Shula F. Sadock, "Computer–Assisted Test Construction: A State of the Art", TME Report 88, Educational Testing Service, Nov. 1985.

Abdel–fattah, "Comparison of the Chi–Square Procedure with the Symmetric Regression Procedure for Developing a Common Metric in Item Response Theory", 1992, Abstract.

Adams et al., "Quest: The Interactive Test Analysis System", 1993, Abstract.

Burstein et al., "GE FRST Evaluation Report: How Well Does a Statistically–Based Natural Language Processing System Score Natural Language Constructed–Responses?", 1995, Abstract.

de la Torre et al., "The Development and Evaluation of a Computerized Adaptive Testing System", 1991, Abstract.

Gearhart et al., "Writing Portfolios at the Elementary Level: A Study of Methods for Writing Assessment", 1992, Abstract.

Halpin et al., "So You Have Chosen an Unequal Cell Size ANOVA Option—Do you Really Know What you Have?", 1991, Abstract.

Henning et al., "Automated Assembly of Pre–equated Language Proficiency Tests", Language Testing, 1994, 11, Abstract.

Kaplan et al., "Using the Free–Response Scoring Tool to Automatically Score the Formulating–Hypotheses Item", 1994, p. 41.

Sebrechts et al., "Agreement between Expert System and Human Raters' Scores on Complex Constructed–Response Quantitative Items", 1991, Abstract.

Smittle, "Computerized Adaptive Testing: Revolutionizing Academic Assessment", Community College J., 1994, 65, Abstract.

Solomon et al., "A Pilot Study of the Relationship between Experts' Ratings and Scores Generated by the NBME's Computer–Based Examination System", Acad. Med., 1992, 67, Abstract.

Stowitschek et al., "A Computerized Risk Index Screening Program for At–Risk Students", 1990, Abstract.

Wang, "An Analytical Approach to Generating Norms for Skewed Normative Distributions", 1992, Abstract.

Weiss et al., "User's Manual for the Basic Math Mastery Tests", 1992, Abstract.

Figure 16

| Essay Number | ID Number | Score |
|---|---|---|
| 1 | 12345 | 3 |
| 2 | 12346 | Not Scored |
| 3 | 12347 | 6 |
| 4 | 12348 | 5 |
| 5 | 12349 | 3 |
| 6 | 12350 | 5 |
| 7 | 12351 | 3 |
| 8 | 12352 | 0 |
| 9 | 12353 | 1 |
| 10 | 12945 | 3 |
| 11 | 12346 | 5 |
| 12 | 12347 | 6 |
| 13 | 12348 | 3 |
| 14 | 12349 | 3 |
| 15 | 12350 | 2 |
| 16 | 12351 | 3 |
| 17 | 12352 | 3 |
| 18 | 12353 | 1 |
| 19 | 12352 | 2 |
| 20 | 12366 | Not Scored |

Click on an essay number to view it. When you are finished scoring all essays, click on DONE.

4/28/98    OSN Network Performance Summary Report of Topics    Page 1 of 2

Date Range: 10/13/1997 To 04/28/1998
Essay Title: Calibration

Testing Program: GMAT    Test Section: Argument

| Topic Name | Total Readings | Exact Total Pct | Adjacent Total Pct | Discrepant Total Pct | NR | 00 | 01 | 02 | 03 | 04 | 05 | 06 | 07 | 08 | 09 | 10 |
|---|---|---|---|---|---|---|---|---|---|---|---|---|---|---|---|---|
| Academic Jobs | 1,870 | 1,249 63 | 572 34 | 49 3 | 0 | 0 | 10 | 15 | 18 | 22 | 23 | 13 | 0 | 0 | 0 | 0 |
| Alpha/Beta | 940 | 511 54 | 397 42 | 32 3 | 0 | 0 | 9 | 17 | 20 | 28 | 19 | 7 | 0 | 0 | 0 | 0 |
| Apathy | 1,160 | 631 54 | 472 41 | 57 5 | 0 | 0 | 8 | 17 | 19 | 27 | 22 | 9 | 0 | 0 | 0 | 0 |
| Apogee Company | 660 | 373 57 | 267 41 | 20 3 | 0 | 0 | 9 | 17 | 17 | 23 | 21 | 14 | 0 | 0 | 0 | 0 |
| Avia Airlines | 390 | 234 60 | 146 37 | 10 3 | 0 | 0 | 13 | 15 | 14 | 21 | 20 | 18 | 0 | 0 | 0 | 0 |
| Big Boards | 1,200 | 676 56 | 477 40 | 47 4 | 0 | 0 | 8 | 20 | 16 | 24 | 20 | 12 | 0 | 0 | 0 | 0 |
| Coffee Consumptio | 160 | 106 66 | 51 32 | 1 1 | 0 | 0 | 6 | 19 | 23 | 19 | 21 | 13 | 0 | 0 | 0 | 0 |
| Company X | 710 | 386 54 | 300 42 | 24 3 | 0 | 0 | 10 | 20 | 17 | 21 | 20 | 12 | 0 | 0 | 0 | 0 |
| Consumers | 1,120 | 582 53 | 467 42 | 61 5 | 0 | 0 | 9 | 17 | 18 | 21 | 23 | 11 | 0 | 0 | 0 | 0 |
| Cumquat Cafe | 250 | 184 74 | 63 25 | 3 1 | 0 | 0 | 8 | 21 | 20 | 25 | 15 | 11 | 0 | 0 | 0 | 0 |
| Drivers Young and | 170 | 82 48 | 75 44 | 3 2 | 0 | 0 | 1 | 17 | 22 | 21 | 18 | 16 | 0 | 0 | 0 | 0 |
| Drug Abuse | 890 | 427 48 | 409 46 | 54 6 | 0 | 0 | 9 | 22 | 17 | 18 | 23 | 12 | 0 | 0 | 0 | 0 |
| East Cambria Spee | 350 | 242 69 | 105 30 | 3 1 | 0 | 0 | 10 | 11 | 17 | 23 | 22 | 17 | 0 | 0 | 0 | 0 |
| Engineers | 370 | 219 59 | 145 39 | 6 2 | 0 | 0 | 7 | 13 | 17 | 23 | 23 | 17 | 0 | 0 | 0 | 0 |
| Gazette | 200 | 109 55 | 86 43 | 5 3 | 0 | 0 | 9 | 11 | 18 | 21 | 30 | 15 | 0 | 0 | 0 | 0 |
| Hospitals | 27 | 19 70 | 3 11 | 5 19 | 0 | 0 | 4 | 44 | 11 | 15 | 19 | 7 | 0 | 0 | 0 | 0 |
| House of Beef | 670 | 429 64 | 222 33 | 19 3 | 0 | 0 | 16 | 20 | 16 | 20 | 17 | 11 | 0 | 0 | 0 | 0 |
| ID Badges | 1,710 | 967 56 | 657 40 | 66 4 | 0 | 0 | 9 | 17 | 18 | 22 | 23 | 12 | 0 | 0 | 0 | 0 |
| Manufacturing Def | 220 | 135 61 | 82 37 | 3 1 | 0 | 0 | 7 | 14 | 16 | 23 | 24 | 16 | 0 | 0 | 0 | 0 |
| Motorcycle X | 1,520 | 754 50 | 598 39 | 168 11 | 0 | 0 | 4 | 15 | 26 | 27 | 22 | 6 | 0 | 0 | 0 | 0 |
| Olympic Foods | 600 | 369 62 | 211 35 | 20 3 | 0 | 0 | 11 | 13 | 15 | 21 | 24 | 16 | 0 | 0 | 0 | 0 |
| Postal Service | 570 | 346 61 | 196 34 | 28 5 | 0 | 0 | 5 | 16 | 18 | 20 | 25 | 16 | 0 | 0 | 0 | 0 |
| Saccher | 590 | 302 51 | 246 42 | 42 7 | 0 | 0 | 8 | 23 | 18 | 21 | 22 | 9 | 0 | 0 | 0 | 0 |
| Solar Energy | 1,060 | 601 57 | 421 40 | 38 4 | 0 | 0 | 10 | 21 | 15 | 23 | 22 | 9 | 0 | 0 | 0 | 0 |
| Styx River Bridge | 420 | 248 59 | 156 37 | 16 4 | 0 | 0 | 10 | 11 | 16 | 21 | 26 | 16 | 0 | 0 | 0 | 0 |
| Subways | 900 | 517 57 | 360 40 | 24 3 | 0 | 0 | 7 | 17 | 27 | 22 | 19 | 9 | 0 | 0 | 0 | 0 |
| Waymarsh | 270 | 200 74 | 67 25 | 3 1 | 0 | 0 | 11 | 16 | 13 | 23 | 19 | 17 | 0 | 0 | 0 | 0 |
| Zapped/Zonked | 170 | 94 55 | 64 38 | 12 7 | 0 | 0 | 11 | 12 | 13 | 21 | 26 | 16 | 0 | 0 | 0 | 0 |

Testing Program: GMAT    Test Section: Issue

| Topic Name | Total Readings | Exact Total Pct | Adjacent Total Pct | Discrepant Total Pct | NR | 00 | 01 | 02 | 03 | 04 | 05 | 06 | 07 | 08 | 09 | 10 |
|---|---|---|---|---|---|---|---|---|---|---|---|---|---|---|---|---|
| Academic Backgro | 1,080 | 430 41 | 483 47 | 127 12 | 0 | 0 | 4 | 19 | 27 | 22 | 20 | 8 | 0 | 0 | 0 | 0 |
| Advertisements | 980 | 470 48 | 357 36 | 163 16 | 0 | 0 | 9 | 14 | 21 | 21 | 22 | 14 | 0 | 0 | 0 | 0 |
| Children/Internet | 410 | 255 62 | 147 36 | 8 2 | 0 | 0 | 3 | 24 | 22 | 22 | 16 | 12 | 0 | 0 | 0 | 0 |
| Competition | 100 | 62 62 | 37 37 | 1 1 | 0 | 0 | 11 | 8 | 16 | 20 | 28 | 17 | 0 | 0 | 0 | 0 |
| Courtesy | 840 | 503 60 | 303 36 | 34 4 | 0 | 0 | 8 | 10 | 17 | 24 | 25 | 16 | 0 | 0 | 0 | 0 |
| Definition of Succe | 650 | 432 67 | 196 31 | 20 3 | 0 | 0 | 17 | 13 | 18 | 20 | 16 | 16 | 0 | 0 | 0 | 0 |
| Designing the Wor | 290 | 170 59 | 111 38 | 9 3 | 0 | 0 | 10 | 16 | 20 | 23 | 16 | 16 | 0 | 0 | 0 | 0 |
| Education and Com | 574 | 348 61 | 214 37 | 12 2 | 0 | 0 | 11 | 18 | 25 | 20 | 16 | 12 | 0 | 0 | 0 | 0 |
| Education and Sue | 500 | 336 67 | 153 31 | 11 2 | 0 | 0 | 8 | 16 | 21 | 24 | 18 | 13 | 0 | 0 | 0 | 0 |
| Employee Confide | 710 | 402 57 | 291 41 | 16 2 | 0 | 0 | 4 | 10 | 21 | 26 | 27 | 12 | 0 | 0 | 0 | 0 |
| Environmental Sta | 780 | 490 62 | 280 36 | 20 3 | 0 | 0 | 11 | 12 | 19 | 19 | 22 | 17 | 0 | 0 | 0 | 0 |
| Essential Traits | 1,160 | 507 44 | 577 50 | 76 7 | 0 | 0 | 4 | 13 | 22 | 22 | 25 | 14 | 0 | 0 | 0 | 0 |
| Getting Results/Ke | 310 | 145 47 | 153 49 | 12 4 | 0 | 0 | 10 | 12 | 16 | 19 | 28 | 15 | 0 | 0 | 0 | 0 |
| Global Homogenei | 400 | 271 66 | 128 32 | 1 0 | 0 | 0 | 12 | 24 | 20 | 20 | 13 | 12 | 0 | 0 | 0 | 0 |
| Government Suppo | 160 | 100 63 | 52 33 | 8 5 | 0 | 0 | 10 | 13 | 23 | 21 | 16 | 18 | 0 | 0 | 0 | 0 |
| Historic Buildings | 848 | 506 60 | 313 37 | 28 3 | 0 | 0 | 7 | 17 | 21 | 23 | 19 | 12 | 0 | 0 | 0 | 0 |
| Incentives | 280 | 162 58 | 111 40 | 7 3 | 0 | 0 | 16 | 26 | 16 | 16 | 17 | 10 | 0 | 0 | 0 | 0 |
| Management Strat | 970 | 412 43 | 435 45 | 123 13 | 0 | 0 | 5 | 19 | 23 | 21 | 23 | 9 | 0 | 0 | 0 | 0 |
| Maximizing Profits | 1,396 | 833 60 | 527 38 | 36 3 | 0 | 0 | 10 | 16 | 18 | 19 | 21 | 16 | 0 | 0 | 0 | 0 |
| Popular Entertainm | 410 | 197 48 | 166 41 | 47 12 | 0 | 0 | 10 | 14 | 18 | 30 | 18 | 11 | 0 | 0 | 0 | 0 |
| Power/Restraint | 780 | 376 56 | 334 45 | 40 5 | 0 | 0 | 6 | 16 | 17 | 27 | 24 | 10 | 0 | 0 | 0 | 0 |
| Private Lives/Work | 2,040 | 1,080 53 | 865 42 | 96 5 | 0 | 0 | 6 | 16 | 18 | 23 | 24 | 11 | 0 | 0 | 0 | 0 |
| Respect | 810 | 368 45 | 378 47 | 64 8 | 0 | 0 | 9 | 13 | 21 | 24 | 22 | 11 | 0 | 0 | 0 | 0 |
| Retraining Workers | 520 | 271 52 | 217 42 | 32 6 | 0 | 0 | 9 | 12 | 23 | 25 | 20 | 11 | 0 | 0 | 0 | 0 |
| Self-Interest and F | 1,260 | 636 51 | 534 42 | 90 8 | 0 | 1 | 6 | 14 | 20 | 26 | 22 | 11 | 0 | 0 | 0 | 0 |
| Short Term Goals | 1,170 | 607 51 | 505 43 | 66 6 | 0 | 0 | 13 | 20 | 18 | 22 | 19 | 9 | 0 | 0 | 0 | 0 |

Figure 23

4/28/98    OSN Center Performance Summary Report of Topics    Page 1 of 5

Date Range: 10/13/1997 To 04/28/1998
Essay Title: Calibration

Scoring Center: Atlanta Scoring Center

Testing Program: GMAT    Test Section: Argument

| Topic Name | Total Readings | Exact Total Pct | Adjacent Total Pct | Discrepant Total Pct | | Percent Score Distributions | | | | | | | | | | | |
|---|---|---|---|---|---|---|---|---|---|---|---|---|---|---|---|---|---|
| | | | | | NR | 00 | 01 | 02 | 03 | 04 | 05 | 06 | 07 | 08 | 09 | 10 | |
| Academic Jobs | 320 | 202 63 | 107 33 | 11 3 | 0 | 0 | 9 | 15 | 16 | 23 | 25 | 12 | 0 | 0 | 0 | 0 | |
| Alpha/Beta | 200 | 99 50 | 92 46 | 9 5 | 0 | 0 | 11 | 16 | 19 | 29 | 20 | 7 | 0 | 0 | 0 | 0 | |
| Apathy | 230 | 109 47 | 106 46 | 15 7 | 0 | 0 | 8 | 17 | 21 | 26 | 19 | 9 | 0 | 0 | 0 | 0 | |
| Apogee Company | 30 | 16 53 | 11 37 | 3 10 | 0 | 0 | 13 | 13 | 20 | 27 | 13 | 13 | 0 | 0 | 0 | 0 | |
| Avis Airlines | 20 | 8 40 | 11 55 | 1 5 | 0 | 0 | 20 | 5 | 10 | 20 | 10 | 35 | 0 | 0 | 0 | 0 | |
| Big Boards | 170 | 87 51 | 74 44 | 9 5 | 0 | 0 | 8 | 18 | 18 | 27 | 17 | 12 | 0 | 0 | 0 | 0 | |
| Coffee Consumptio | 40 | 25 63 | 15 38 | 0 0 | 0 | 0 | 10 | 18 | 20 | 18 | 18 | 18 | 0 | 0 | 0 | 0 | |
| Company X | 140 | 74 53 | 58 41 | 8 6 | 0 | 0 | 11 | 16 | 17 | 21 | 19 | 16 | 0 | 0 | 0 | 0 | |
| Consumers | 220 | 112 51 | 91 41 | 17 8 | 0 | 0 | 9 | 17 | 16 | 20 | 26 | 13 | 0 | 0 | 0 | 0 | |
| Cumquat Cafe | 80 | 56 70 | 24 30 | 0 0 | 0 | 0 | 11 | 19 | 24 | 23 | 13 | 11 | 0 | 0 | 0 | 0 | |
| Drivers Young and | 40 | 19 48 | 20 50 | 1 3 | 0 | 0 | 0 | 15 | 23 | 20 | 23 | 20 | 0 | 0 | 0 | 0 | |
| Drug Abuse | 180 | 86 48 | 83 46 | 11 6 | 0 | 0 | 9 | 19 | 18 | 17 | 27 | 9 | 0 | 0 | 0 | 0 | |
| East Cambria Spee | 60 | 43 72 | 17 28 | 0 0 | 0 | 0 | 10 | 13 | 20 | 23 | 18 | 15 | 0 | 0 | 0 | 0 | |
| Engineers | 50 | 27 54 | 23 46 | 0 0 | 0 | 0 | 4 | 14 | 18 | 30 | 18 | 16 | 0 | 0 | 0 | 0 | |
| House of Beef | 130 | 75 58 | 49 38 | 6 5 | 0 | 0 | 16 | 20 | 15 | 22 | 15 | 12 | 0 | 0 | 0 | 0 | |
| ID Badges | 340 | 184 54 | 143 42 | 13 4 | 0 | 0 | 7 | 17 | 17 | 22 | 25 | 12 | 0 | 0 | 0 | 0 | |
| Manufacturing Del | 60 | 44 73 | 15 25 | 1 2 | 0 | 0 | 10 | 12 | 15 | 23 | 23 | 17 | 0 | 0 | 0 | 0 | |
| Motorcycle X | 270 | 132 49 | 104 39 | 34 13 | 0 | 0 | 3 | 14 | 27 | 29 | 21 | 6 | 0 | 0 | 0 | 0 | |
| Olympic Foods | 130 | 78 60 | 43 33 | 9 7 | 0 | 0 | 10 | 13 | 15 | 21 | 27 | 15 | 0 | 0 | 0 | 0 | |
| Postal Service | 80 | 46 58 | 33 41 | 1 1 | 0 | 0 | 4 | 16 | 21 | 20 | 29 | 10 | 0 | 0 | 0 | 0 | |
| Sacchar | 90 | 47 52 | 38 42 | 5 6 | 0 | 0 | 8 | 21 | 20 | 20 | 20 | 11 | 0 | 0 | 0 | 0 | |
| Solar Energy | 220 | 111 51 | 104 47 | 5 2 | 0 | 0 | 11 | 21 | 14 | 23 | 24 | 8 | 0 | 0 | 0 | 0 | |
| Styx River Bridge | 90 | 47 52 | 41 46 | 2 2 | 0 | 0 | 10 | 12 | 11 | 26 | 26 | 16 | 0 | 0 | 0 | 0 | |
| Subways | 150 | 82 55 | 61 41 | 7 5 | 0 | 0 | 6 | 17 | 28 | 21 | 20 | 8 | 0 | 0 | 0 | 0 | |
| Waymarsh | 70 | 48 69 | 20 29 | 2 3 | 0 | 0 | 13 | 14 | 11 | 21 | 21 | 19 | 0 | 0 | 0 | 0 | |

Testing Program: GMAT    Test Section: Issue

| Topic Name | Total Readings | Exact Total Pct | Adjacent Total Pct | Discrepant Total Pct | | Percent Score Distributions | | | | | | | | | | | |
|---|---|---|---|---|---|---|---|---|---|---|---|---|---|---|---|---|---|
| | | | | | NR | 00 | 01 | 02 | 03 | 04 | 05 | 06 | 07 | 08 | 09 | 10 | |
| Academic Backgro | 190 | 76 40 | 96 51 | 18 10 | 0 | 0 | 4 | 18 | 26 | 23 | 22 | 8 | 0 | 0 | 0 | 0 | |
| Advertisements | 240 | 119 50 | 91 38 | 30 13 | 0 | 0 | 10 | 13 | 20 | 22 | 21 | 14 | 0 | 0 | 0 | 0 | |
| Children/Internet | 50 | 27 54 | 20 40 | 3 6 | 0 | 0 | 2 | 22 | 20 | 26 | 16 | 14 | 0 | 0 | 0 | 0 | |
| Courtesy | 120 | 64 53 | 49 41 | 7 6 | 0 | 0 | 7 | 12 | 16 | 23 | 28 | 15 | 0 | 0 | 0 | 0 | |
| Definition of Succe | 40 | 21 53 | 18 45 | 1 3 | 0 | 0 | 13 | 18 | 15 | 10 | 28 | 18 | 0 | 0 | 0 | 0 | |
| Designing the Wor | 50 | 29 58 | 21 42 | 0 0 | 0 | 0 | 12 | 18 | 22 | 12 | 14 | 22 | 0 | 0 | 0 | 0 | |
| Education and Com | 60 | 39 65 | 21 35 | 0 0 | 0 | 0 | 7 | 18 | 30 | 20 | 12 | 13 | 0 | 0 | 0 | 0 | |
| Education and Suc | 100 | 56 56 | 38 38 | 6 6 | 0 | 0 | 7 | 20 | 22 | 17 | 21 | 13 | 0 | 0 | 0 | 0 | |
| Employee Confide | 110 | 65 59 | 41 37 | 4 4 | 0 | 0 | 3 | 12 | 19 | 25 | 32 | 10 | 0 | 0 | 0 | 0 | |
| Environmental Sta | 140 | 82 59 | 54 39 | 4 3 | 0 | 0 | 11 | 11 | 19 | 21 | 17 | 20 | 0 | 0 | 0 | 0 | |
| Essential Traits | 190 | 80 42 | 92 48 | 18 10 | 0 | 0 | 6 | 9 | 23 | 25 | 23 | 16 | 0 | 0 | 0 | 0 | |
| Getting Results/Ke | 50 | 24 48 | 25 50 | 1 2 | 0 | 0 | 8 | 8 | 18 | 20 | 34 | 12 | 0 | 0 | 0 | 0 | |
| Global Homogenei | 90 | 53 59 | 36 40 | 1 1 | 0 | 0 | 13 | 26 | 19 | 20 | 11 | 11 | 0 | 0 | 0 | 0 | |
| Historic Buildings | 195 | 118 61 | 72 37 | 5 3 | 0 | 0 | 6 | 18 | 23 | 22 | 19 | 13 | 0 | 0 | 0 | 0 | |
| Incentives | 80 | 48 60 | 31 39 | 1 1 | 0 | 0 | 15 | 28 | 14 | 16 | 20 | 8 | 0 | 0 | 0 | 0 | |
| Management Strate | 210 | 84 40 | 97 46 | 29 14 | 0 | 0 | 6 | 14 | 26 | 21 | 27 | 5 | 0 | 0 | 0 | 0 | |
| Maximizing Profits | 264 | 143 54 | 116 44 | 5 2 | 0 | 0 | 12 | 15 | 19 | 20 | 19 | 16 | 0 | 0 | 0 | 0 | |
| Popular Entertainm | 10 | 4 40 | 5 50 | 1 10 | 0 | 0 | 10 | 10 | 10 | 40 | 20 | 10 | 0 | 0 | 0 | 0 | |
| Power/Restraint | 120 | 58 48 | 53 44 | 9 8 | 0 | 0 | 6 | 14 | 20 | 27 | 23 | 12 | 0 | 0 | 0 | 0 | |
| Private Lives/Work | 260 | 136 52 | 110 42 | 14 5 | 0 | 0 | 8 | 17 | 15 | 24 | 21 | 14 | 0 | 0 | 0 | 0 | |
| Respect | 160 | 68 43 | 73 46 | 19 12 | 0 | 0 | 9 | 18 | 19 | 23 | 21 | 11 | 0 | 0 | 0 | 0 | |
| Retraining Workers | 100 | 51 51 | 44 44 | 5 5 | 0 | 0 | 8 | 15 | 25 | 22 | 17 | 13 | 0 | 0 | 0 | 0 | |
| Self-Interest and F | 250 | 132 53 | 99 40 | 19 8 | 0 | 0 | 6 | 13 | 15 | 24 | 29 | 13 | 0 | 0 | 0 | 0 | |
| Short Term Goals | 190 | 87 46 | 88 46 | 15 8 | 0 | 0 | 15 | 20 | 20 | 19 | 20 | 6 | 0 | 0 | 0 | 0 | |
| Teams | 190 | 110 58 | 72 38 | 8 4 | 0 | 0 | 4 | 14 | 21 | 27 | 27 | 7 | 0 | 0 | 0 | 0 | |

Scoring Center: Educational Testing Svc

Candidate Sample Essay Volume Report    Page 1 of 2

Testing Program: GMAT    Date Range: 01/28/1998 To 04/28/1998

Test Section: Argument    Minimum number of Readings: 1

| Topic | Scoring Leader 1– Open | Scoring Leader 1– Pend | Scoring Leader 2– Open | Scoring Leader 2– Pend | Qualified Samples | Reject Samples | Processed Samples | Total Samples |
|---|---|---|---|---|---|---|---|---|
| Avia Airlines | 0 | 0 | 0 | 0 | 0 | 0 | 0 | 0 |
| Big Boards | 0 | 0 | 0 | 0 | 0 | 0 | 0 | 0 |
| Cumquat Cafe | 0 | 0 | 0 | 0 | 0 | 0 | 0 | 0 |
| Drug Abuse | 0 | 0 | 0 | 0 | 0 | 0 | 0 | 0 |
| House of beef | 0 | 0 | 0 | 0 | 0 | 0 | 0 | 0 |
| ID Badges | 0 | 0 | 0 | 0 | 0 | 0 | 0 | 0 |
| McMahon add for OSNA120 | 0 | 0 | 0 | 0 | 0 | 0 | 0 | 0 |
| Motorcycle X | 0 | 0 | 0 | 0 | 0 | 0 | 0 | 0 |
| Sacchar | 0 | 0 | 0 | 0 | 0 | 0 | 0 | 0 |
| Subways/Buses | 0 | 0 | 0 | 0 | 0 | 0 | 0 | 0 |
| Waymarsh | 0 | 0 | 0 | 0 | 0 | 0 | 0 | 0 |
| Worker Apathy | 0 | 0 | 0 | 0 | 0 | 0 | 0 | 0 |
| Zapped/Zonked | 0 | 0 | 0 | 0 | 0 | 0 | 0 | 0 |
| Test SectionTotal: | 0 | | | | | | | 0 |

Figure 28

COMPUTERIZED SYSTEM FOR SCORING CONSTRUCTED RESPONSES AND METHODS FOR TRAINING, MONITORING, AND EVALUATING HUMAN RATER'S SCORING OF CONSTRUCTED RESPONSES

CROSS REFERENCE TO RELATED APPLICATIONS

This application is related to U.S. Provisional Patent application Ser. No. 60/044,319, filed Mar. 21, 1997, entitled "Computerized System for Scoring Constructed Responses and Methods for Training, Monitoring, and Evaluating Human Raters Scoring of Constructed Responses," and U.S. Provisional Patent application Ser. No. 60/061,781, filed Oct. 10, 1997, entitled "Computerized System for Scoring Constructed Responses and Methods for Training, Monitoring, and Evaluating Human Raters Scoring of Constructed Responses," the contents of which are hereby incorporated by reference in their entirety.

FIELD OF THE INVENTION

The present invention generally relates to systems and methods for assessment of constructed responses to electronic test questions. More specifically, the invention relates to the presentation of constructed responses through electronic workfolders for human evaluation and the selection and categorization of constructed responses for use in training and for quality control purposes.

BACKGROUND OF THE INVENTION

A recent trend in testing emphasizes a move beyond traditional multiple choice tests in favor of tests that require open-ended responses such as essay responses. These open-ended responses are often referred to as constructed responses (CRs). However, CRs are not limited to written text, but may include graphics, videotaped performances, audio responses, as well as other forms of responses. In order to improve the efficiency of scoring large scale standardized tests, both those offered at periodic administrations as well as those offered essentially on a daily basis, computer systems have been developed to automatically score multiple-choice responses and other simple response types. While some automatic scoring systems have been designed to score particular types of CRs (see e.g., U.S. patent application Ser. No. 08/794,498, entitled Automatic Scoring for Categorized Figural Responses, assigned to the same assignee hereunder), the evaluation of CRs is particularly well-suited to human raters. For this reason, certain computer scoring systems have been developed to facilitate and automate the electronic transmission of CRs to human raters for evaluation and scoring. However, these conventional computer scoring systems currently have many disadvantages.

Conventional computer scoring systems generally include a centralized processor such as a server or mainframe computer and terminals or workstations (hereinafter "rater stations") interfaced with the centralized processor. The centralized processor is also interfaced with a data storage device in which CRs in electronic form are stored. The CRs may be scanned images or ASCII text, for example. The centralized processor transmits one CR at a time to a rater station for scoring by a rater or scorer operating at the rater station. The rater enters a score via the rater station. The score is typically transmitted back to the centralized processor for storage in the data storage device.

However, the distribution of CRs one-at-a-time often results in noticeable delay between the request for the CRs and receipt of the CRs at the rater stations for scoring, and therefore, does not maximize the raters' time for scoring responses. Moreover, once a score is entered by the rater and committed, i.e., transmitted back to the server and recorded in the storage device, the rater has no opportunity thereafter to review the CR or modify the score awarded. This disadvantage may be significant when a rater begins a scoring session and after scoring a number of CRs decides that the earlier scores awarded were either too lenient or too harsh. Thus, there exists a need for a scoring system that efficiently transmits a plurality of CRs to a rater station such that the rater may review both the CRs and scores awarded in any order before committing the scores to the scoring system.

Furthermore, there exists a recognized need to properly train and monitor human raters to assure that the scoring is accurate and reliable. In computer scoring systems, monitoring performance has been accomplished through the presentation of monitoring CRs, i.e., CRs which are associated with predetermined or qualified scores. Such CRs may also be used for training purposes to help new raters learn how to assess CRs in accordance with certain scoring criteria. CRs having known scores associated with them may also be useful in assisting more experienced raters calibrate their scoring prior to scoring CRs during a scoring session. Other CRs with known scores may be useful in certifying new raters to qualify them prior to scoring.

In addition, benchmark CRs and rangefinder CRs which exemplify CRs having a particular known score have been used in manual scoring assessments to guide raters in identifying CRs warranting particular scores. Benchmark CRs may specifically be used across test administrations to define the score points. Rangefinder CRs are typically shown to raters as a set so that the rater may practice scoring a CR with a given score.

Conventional computer scoring systems do not transmit benchmark CRs or rangefinder CRs to rater stations for use by raters during scoring. Moreover, conventional scoring systems do not have the capability to select CRs for different uses, e.g., training, calibration, certification, etc. Thus, there further exists a need for computer scoring systems that provide an efficient means for selecting and distributing various types of CRs to raters based on their experience.

Furthermore, conventional computer scoring systems have limited gathering and reporting capabilities. Typically, in prior art scoring systems, the only type of data that is available is that collected for an individual scorer. Further, the statistical information on reader performance is collected only for specified scoring sessions as opposed to continuously from the time the reader becomes certified. Also, because most prior art systems are designed around one centralized processor, often there is a delay between when a rater or scorer takes an action and when the action will be included in a report. Thus, statistics are not available in "real time." Furthermore, prior art scoring systems do not gather and report statistics on the wide variety of transactions for which it would be useful to have such statistics. For example, it would be useful and a great advancement in the art to be able to generate a report regarding scoring on a particular test or topic area, or statistics generated for a particular scoring center, or system wide statistics involving all scoring centers. Thus, there exists a need for a scoring system that provides immediate and in depth data reporting on scorers, site and system wide transactions. The present invention addresses these many needs in the art.

SUMMARY OF THE INVENTION

The present invention provides systems and methods for use in transmitting a number of constructed responses at one time to a reader or rater for evaluation and for receiving scores from the reader for the number of constructed responses at one time. The systems and methods further provide for selection and categorization of constructed responses for use in training, monitoring and assisting raters during training and actual production scoring for quality control purposes. The systems and methods overcome the limitations of the prior art systems described above and provide a more efficient means for distribution of constructed responses and for assembly of qualified constructed responses for use as monitoring and quality assurance tools. The systems and methods also provide a means to monitor rater and topic performance using immediate and cumulative data statistics.

The systems of the present invention utilize a database for storage of constructed responses and the prompts associated with the constructed responses. A processing unit may then automatically organize a number of associated constructed responses (i.e., those in response to the same topic) into an electronic workfolder for distribution to raters located at a plurality of rater stations. An electronic workfolder provides a means to group related constructed responses and thereby facilitate distribution of the constructed responses. The raters receiving the electronic workfolders may then access the constructed responses in any order within the workfolder. Furthermore, the raters may review and alter the scores awarded to the constructed responses within the electronic workfolders before the scores are committed and then transmitted to and stored in the database in relation to the constructed responses. The constructed responses may be separated into various categories based on predefined criteria and then organized into a given workfolder based on their category designation. Each rater may also be assigned to various test sections based on the rater's qualification status and the distribution of the workfolders to that rater may also be based on the rater's qualification status.

In the systems and methods of the present invention, the constructed responses are usually transmitted to the first two raters as part of the normal production scoring operation, preferably in an electronic workfolder of constructed responses. Most constructed responses are transmitted to at least two raters for scoring to ensure consistency and fairness of the final scores awarded. The system is designed so that, when analyzing the scores awarded to a constructed response by the two raters, the scores are compared to determine if they are the same. If so, the constructed response is designated as a candidate sample constructed response and then transmitted, in an electronic workfolder with other candidate sample constructed responses, to up to two more raters. If those raters also award the constructed response the same score as was awarded by the first two raters, the constructed response is designated a qualified sample constructed response. The systems and methods of the present invention then automatically transmit the qualified sample constructed responses to a test developer for categorization.

The qualified sample constructed responses will be used for quality control monitoring, for training, and as guidelines for raters who are evaluating the constructed responses which still require scores. Therefore, the test developers determine a category for the qualified sample constructed responses based on the ability of the constructed response to meet the particular needs of each category. The qualified sample constructed responses are divided into one of six categories: calibration, certification, training sample, monitoring, benchmark and rangefinder. Each category is used for different purposes. For example, calibration constructed responses are used during training as practice for new raters in applying the scoring guidelines and as practice for experienced raters as well. Training sample constructed responses provide constructed responses on which multiple persons can practice or train. In this way, training sample constructed response provide the opportunity for a shared learning experience and thereby greatly improves the learning process. Certification constructed responses are used to test trainee raters after training and calibration on a specific topic or prompt has been performed. The systems and methods thus provide the test developers with the qualified constructed responses and the categories. The test developers then assign the qualified constructed responses to a specific category on-line. The constructed response is then stored in the storage means in relationship to the category for future use and distribution to raters.

Also, the systems and methods of the present invention provide a unified system for training and production scoring. Training, as discussed above, is used to standardize scoring by raters so that the raters consistently apply scoring guidelines. The raters who have successfully completed training are then qualified to assess and score production constructed responses. These raters, too, are preferably monitored to ensure consistency and fairness in scoring of standardized tests. All raters, whether in training or after certification, preferably have access to the scoring guidelines and sample constructed responses that represent the rubrics for a particular prompt or topic. Thus, the systems and methods of the present invention use a central database for storing the constructed responses for use in monitoring, training and assisting raters during scoring. This allows all raters access to the sample constructed responses and, thus, maximizes consistency and efficiency.

In a preferred embodiment, a plurality of rater stations from which raters may evaluate and score constructed responses is used. Raters working at the various rater stations may be in training, or may be certified or experienced raters scoring production constructed responses. A processor accesses the database and selects and transmits constructed response electronic workfolders to the rater stations. The selection of constructed responses to transmit to the rater stations may be based on whether the rater working at the rater station is in training or has been qualified and is actually scoring production responses. A rater may select the type of workfolder that he/she is assigned by selecting calibration, certification, or production from the menu. Once the rater selects the type of workfolder, the system may check their qualification status and then list the testing program and test section for which the rater is qualified to score. The rater will select from that list and the workfolder will be created for that particular testing program and test section (for a particular topic).

In a preferred embodiment, a communication means is used to transmit the constructed responses to the rater stations and to transmit the scores awarded by the raters to the storage means. The unified system may also utilize the systems and methods described above such that constructed responses are transmitted to the rater stations in workfolders.

The preferred embodiment further comprises a monitoring functionality that allows for the generation of statistical reports regarding rater performance and system transactions. Data regarding a transaction is available for reporting immediately after a transaction takes place in the system. The system statistics are cumulative and can be generated to evaluate rater performance, topic performance, the volume of essays pending in the system, and the volume of candidate samples that are pending in the system.

BRIEF DESCRIPTION OF THE DRAWINGS

A full understanding of the invention can be gained from the following description of preferred embodiments when read in conjunction with the accompanying drawings in which:

FIG. 16 shows the presentation of the last CR in a workfolder of twenty CRs;

FIG. 17 shows a score summary display;

FIG. 18 shows a display of a CR that has been selected from the score summary display;

FIG. 21 is an example of a scoring center rater performance report generated using the system monitoring functionality;

FIG. 23 is a an example of a network topic performance summary report generated using the present system;

FIG. 25 is a an example of a scoring center topics performance summary report generated using the present system;

FIG. 28 is an example of a candidate sample volume summary report generated using the present system.

DETAILED DESCRIPTION OF THE PREFERRED EMBODIMENTS

Systems and methods which fulfill the above-mentioned needs and provide other beneficial features in accordance with the present invention are described below with reference to the figures. Those skilled in the art will readily appreciate that the description given herein with respect to the figures is for explanatory purposes only and is not intended in any way to limit the scope of the invention. Also, common reference numbers are used throughout the figures to represent common elements.

Figure 1:
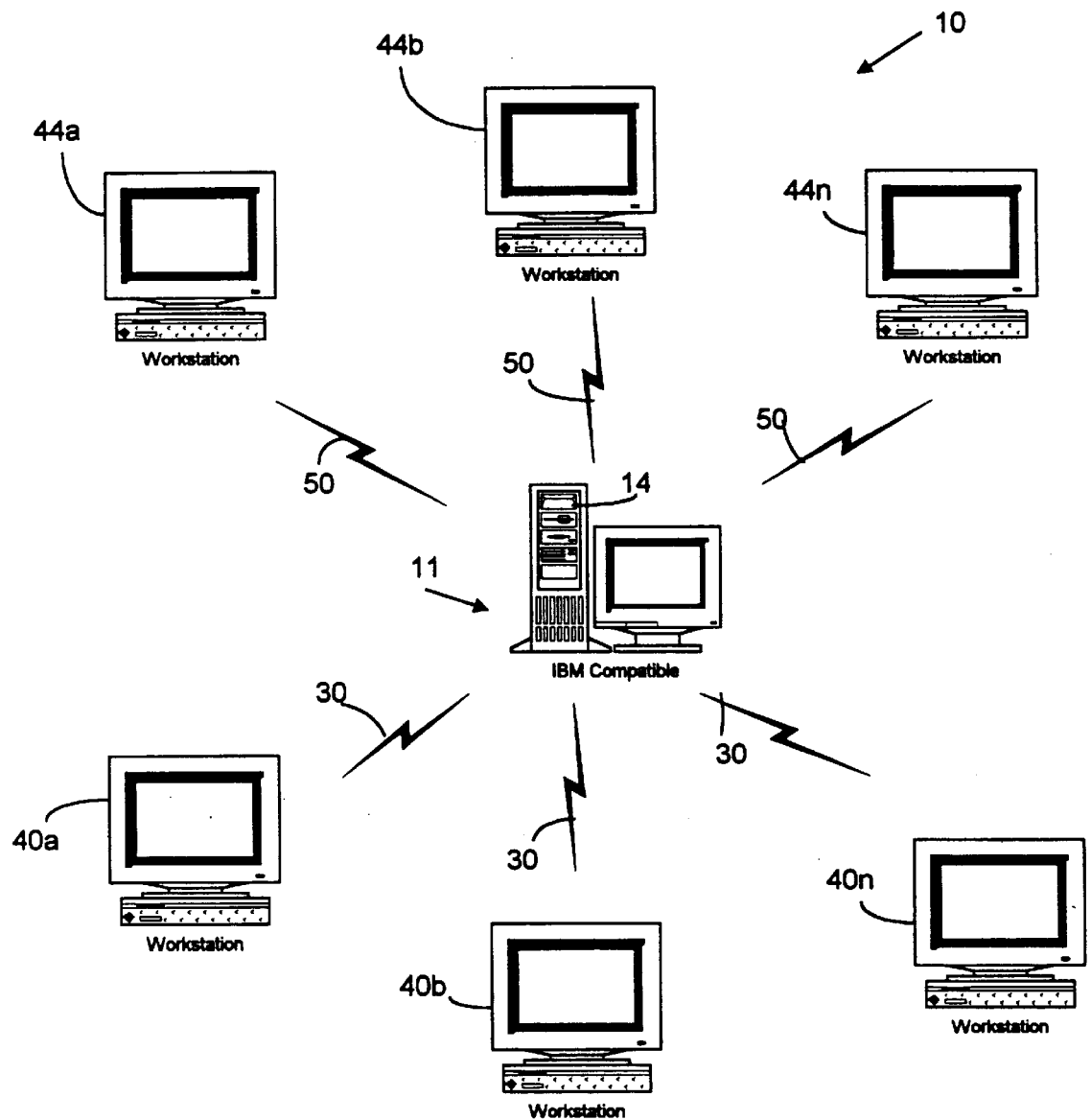
FIG. 1 shows a system block diagram of a preferred embodiment of the present invention.

Referring now to the figures, FIG. 1 shows a system block diagram of a preferred embodiment of the present invention. The computer scoring system 10 of the invention preferably includes central computer 11 capable of storing databases including CRs and the scores awarded by the raters. The scoring system also may include a processor 14 which can access the databases. The processor 14 preferably implements an operating system that is capable of running computer applications needed for the presentation of the CRs to the raters.

The scoring system may be implemented as a stand-alone system with one computer, e.g., central computer 11. However, in a preferred embodiment, a number of rater stations 40a, 40b, . . . 40n are provided. The rater stations may be merely "dumb terminals" or network computers coupled to the system via a communication means 30, such as a data bus, local area network, wide area network, or the Internet which may be used to transmit information from a central computer database to the rater stations. It should be understood, however, that if the rater stations are network computers the scoring system 10 may be implemented by a central server (as shown in FIG. 1) instead of a stand-alone computer system. Each rater station preferably includes a processor and an operating system. In that way the central server or central computer may transmit a computer application to the rater station and instructions to the operating system at the rater station to enable and initiate the computer application for presenting various CR types. Alternatively, the rater stations may include a storage medium for storing the computer applications used in presenting the CRs. Use of this alternative embodiment minimizes the amount of data transmitted from the server or central computer to the rater stations, reduces the time necessary to commence scoring and reduces traffic on the communications network.

Thus, in a preferred embodiment, each rater station includes a personal computer having at least a 386 processor, but more preferably a PENTIUM processor, or equivalent thereof, and a suitable hard drive for storing appropriate computer applications, CRs and other local programs executed to carry out the invention as discussed in more detail below. It should further be understood that laptop and hand-held computers may also be utilized as rater stations. In a more preferred embodiment, the database stored by the central computer 11 may be accessed directly by the rater stations with programs stored locally by the rater station carrying out the functions of the present invention described below.

In addition, the scoring system 10 includes a means for presenting the CRs to the raters in a meaningful way for them to review. Thus, the presentation means may include a monitor, an audio device, such as a speaker, a telephonic communication, or a videotape or audio tape player, or a fully digitized video system displayed on the computer monitor. Each of the rater stations is preferably capable of presenting the CRs in a similar manner as would a stand-alone system.

The scoring system also includes a means for allowing a rater to enter the score to be awarded or other assessment information relating to the CR presented. It should be understood that scores may be entered in a number of ways, see e.g., U.S. Pat. No. 4,978,305, assigned to Educational Testing Service, which discloses raters recording scores on paper and then entering the scores into the system using a bar code wand device. However, in preferred embodiments, the input means will allow raters to directly enter scores into the scoring system through the use of a keyboard or a mouse located at the rater station. Once the scores or assessment information is received by the system, the scores are entered and stored in the central computer database in relation to the CRs to which they were awarded without the need for additional paper and while reducing the possibility of human error corrupting the score assignment.

Raters may be assigned to each or some of the rater stations 40a–40n or to the central computer 11, if equipped as a rater station. Each rater preferably reviews the CRs presented at their respectively assigned stations and awards a score in response to the CR presented. In a preferred embodiment any such rater station may be used by a scoring leader to perform other functions such as monitoring.

The scoring system 10 of the present invention also preferably includes a plurality of test developer stations 44a, 44b, . . . 44n at which test developers may review certain CRs for categorizing the use of those CRs as will be discussed in more detail below in connection with FIGS. 2 and 7. Each test developer station 44a, 44b, . . . 44n preferably includes a personal computer having at least a 386 processor, but more preferably a PENTIUM processor, or equivalent thereof, and a suitable hard drive for storing the computer applications for presenting the CRs, the CRs themselves, and other local programs executed to carry out the invention as discussed in detail below.

The test developer stations are interfaced with the central computer 11 using a means for communication 50, which may include a data bus, a local area network, a wide area network or the Internet. The central computer preferably transmits particular CRs, discussed in detail below, to the test developer stations for evaluation and further processing. Alternatively, the test developer stations may directly access certain CRs and other information stored in the central computer database.

Figure 2:
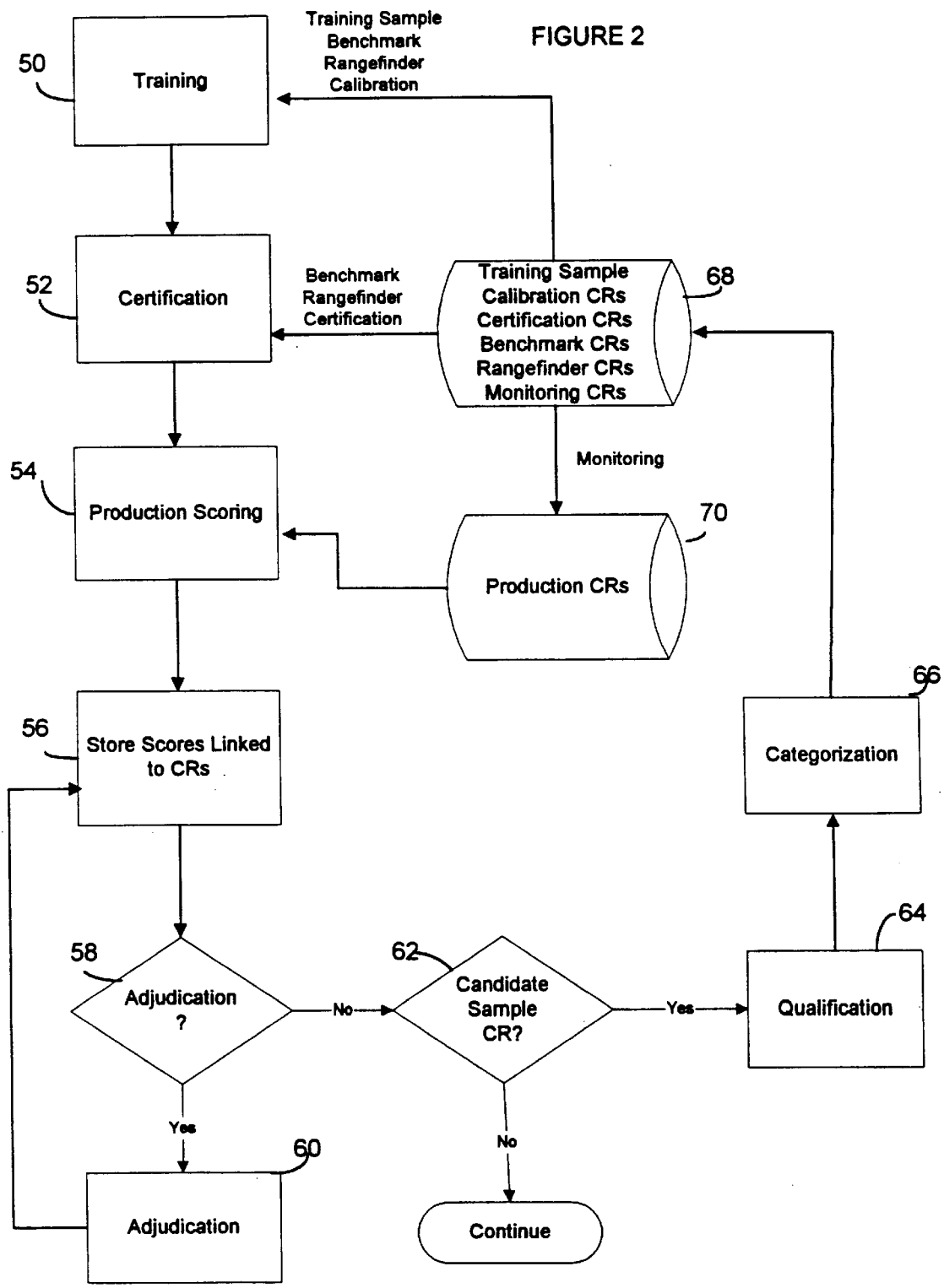
FIG. 2 shows a functional flow diagram of the system operation in accordance with the present invention.

FIG. 2 shows a functional flowchart of the overall operation of a scoring system in accordance with the present invention. In accordance with the present invention, the scoring system provides an integrated approach to training, production scoring or assessment, and monitoring. The CRs are categorized into separate classifications depending upon how the particular CR is intended to be used by the scoring system. As shown in FIG. 2, the CRs may be stored linked to their respective classifications in databases 68 and 70. It should be understood that databases 68 and 70 may be combined as a single database or separated into multiple databases with different data allocations than that shown in FIG. 2.

Calibration CRs, training sample CRs, benchmark CRs, rangefinder CRs, monitoring CRs, and certification CRs are specifically shown as being stored in database 68. Calibration CRs, as described more fully below, are CRs that have been classified for use by trainees or for use by those performing production scoring to practice scoring certain types of CRs. Benchmark and rangefinder CRs, also described more fully below, are used by raters to help them better understand the criteria of a CR at each score level, i.e., examples of CRs which have been awarded particular scores. Training sample CRs are CRs that may be made available to multiple persons. For example multiple persons attending a training session might have access to the same training sample CR so that the persons attending can follow an instructor who is similarly working on the same sample CR. Thus, by providing a single CR upon which multiple persons can practice, the system provides for a common training experience. The monitoring CRs are CRs which are associated with predetermined scores and are used during production scoring to monitor the raters' performances as is described below. The certification CRs are CRs that are included in a certification test given to trainees before the trainee is permitted to actually score production CRs. The CRs provided for production scoring are those CRs received from a test administration and are stored in database 70. In a preferred embodiment, as discussed below in detail, monitoring CRs are inserted among the production CRs during a scoring session.

As shown in FIG. 2 raters are preferably trained using the scoring system of the present invention as shown at step 50. During training, raters review information such as scoring guides, topic annotations, benchmark CRs, training sample CRs, and rangefinder CRs. Raters then request and are presented with calibration CRs until they become sufficiently proficient in scoring the calibration CRs.

Once a rater is competently scoring the calibration CRs, the rater may wish to be certified to score production CRs. In a preferred embodiment, that rater must be certified by passing a certification test at step 52. The certification test preferably includes a number of certification CRs from database 68 that must be scored accurately (as may be defined by a particular testing program) and monitored by the scoring system of the present invention. When a rater has successfully completed the certification test, the rater is then ready to score production CRs at step 54. In a preferred embodiment, benchmark and rangefinder CRs may be accessed by raters while in training, calibration, certification, or production scoring.

During the scoring process at step 54, the rater is presented with a production CR from database 70 and enters a score into the rater station and then commits the score to the database at step 56. In a preferred embodiment, each production CR is scored by at least two different raters (or by one rater and an automatic scoring system having an interface with the scoring system of the present invention) on an individual basis. The scoring system compares the scores awarded to the same CR and at step 58 determines whether the score for that CR requires adjudication. Adjudication may be required when the scores awarded, for example, differ by at least some predefined amount which may be established by the testing program. If adjudication is required, the production CR is routed to an experienced rater who may be a scoring leader or other third rater at step 60. The experienced rater's score is stored in the database linked to the CR at step 56. In a preferred embodiment, the need for a final adjudication of the score by a scoring leader may be determined based on the experienced rater's score. It should also be understood that a rater's score may be compared to a score awarded by an automatic scoring system in connection with the determination as to whether or not the rater's score requires adjudication.

In a preferred embodiment, certain CRs are selected as candidate sample CRs which are discussed below in detail. These candidate sample CRs are those that may become classifiable as one of the types of CRs stored in database 68. At step 62 the scoring system makes a determination as to whether or not the production CR that has been awarded a score that was stored at step 56 satisfies the requirements for a candidate sample CR. If so, the candidate sample CR is qualified at step 64 through a procedure which is described below in detail. If the candidate sample CR is qualified, a test developer or scoring leader for example, preferably classifies the qualified sample CR for use in calibration or certification or as a training sample, benchmark, rangefinder or monitoring CR as shown at step 66.

In preferred embodiments as discussed below, calibration, training sample, certification and production CRs are transmitted to raters in electronic workfolders so that a number of CRs are assigned to that rater. Workfolders contain section and topic-specific constructed responses. If a rater does not complete a workfolder, scores on all scored essays are captured and all unscored essays are refoldered and redistributed. The workfolders are grouped by topic within test sections. The CRs are preferably stored in the database linked to the appropriate topic. Moreover, raters are preferably trained and certified by test section.

Raters are preferably classified by their status as trainee, certified, experienced, or scoring leader. A rater is classified as a trainee when they are first given access to a new testing program and test section. Trainees are prospective raters who are in the process of learning how to use the system and how to apply the scoring standards of the particular testing program and test section. Trainees have access only to the training functions including topic support, calibration, certification and training samples. A trainee is given access to training materials, training sample workfolders and calibration/certification workfolders.

A certified rater is one that has demonstrated competence at the test section level by passing a certification test. The passing score is set by individual testing programs. Certified raters may read and score production essays.

Experienced raters are certified raters with a program-defined level of expertise who may score production essays. Further, the system may route adjudication constructed responses to experienced raters for scoring. Experienced raters have access to training and scoring functions in the system.

Scoring leaders are certified raters who, because of their expertise, monitor the performance of trainees and certified raters. Scoring leaders intervene if trainees need additional support or if certified raters drift off scale. Scoring leaders have access to the training, scoring monitoring, and utilities functions of the system. A scoring leader has the primary responsibilities of training, assisting, assigning, and monitoring the work of raters. A scoring leader's secondary responsibilities include reading/scoring production CRs, reading/scoring sample CRs, and performing adjudication for those rare cases when a score cannot be determined after a third reading.

Raters may be qualified to score one or more test sections and may have a different status associated with the various test sections the rater is qualified to score. For example, the same rater may be training for argument-based CRs, but be qualified as an experienced rater for issue-based CRs, and a scoring leader for another test section. It should be understood that raters may be qualified by subject matter or other criteria in lieu of test sections and may also be qualified with different statuses than those described in connection with this preferred embodiment of the invention.

Figure 3:
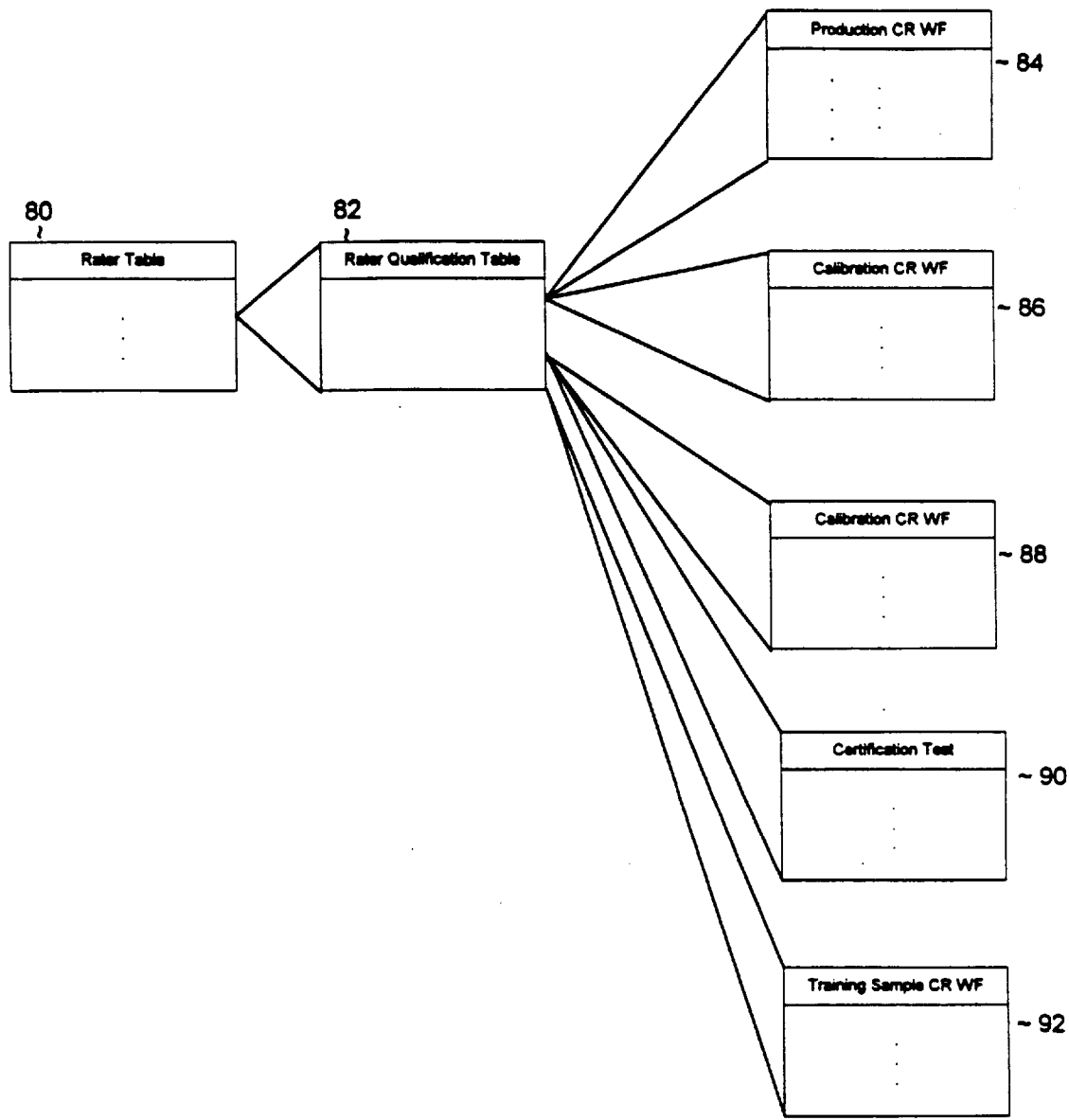
FIG. 3 shows an exemplary relational database implemented in accordance with the present invention.

FIG. 3 shows an example of a relational database structure in which the CRs and rater information may be stored in accordance with the present invention. It should be understood that other information storage structures may be used in a manner that links the relevant data together such that it can be accessed by the scoring system of the present invention. Referring to FIG. 3, rater table 80 may include records with a unique code identifying each rater, defined herein as the rater ID, and other information about the rater. Each rater record is preferably linked to a rater qualification table 82 for that rater which comprises records for each test section that the rater is qualified to score with an indication of the rater's status for each test section.

When the rater logs on or is active as described below in detail, workfolder tables are linked to the test sections listed in the rater qualification table 82. For example, if a rater is qualified as "certified" for test section "X" then a link might be made to calibration CRs workfolder table 86 which comprises records identifying those calibration workfolders that may be presented to the rater. In addition, the rater may be presented with production CR workfolders identified in the production CR workfolder table 84 for test section "X". If the rater, however, has a trainee status for test section "Y," then the rater may be presented with CRs from workfolders identified by the calibration CR workfolder table 88. Moreover, a rater in training preferably is presented with only specified certification tests 90 linked to the test section for that rater. Finally, when a rater is in training and is in the process of grading a particular training sample CR, the rater is linked to the training sample CR. Each of the workfolders designated in tables 84, 86, 88, 90, 92 may specify particular CRs stored in database 68 or database 70 described above in connection with FIG. 2. When scores are awarded and committed, the scores are preferably stored in association with the CRs in databases 68, 70.

Figure 4:
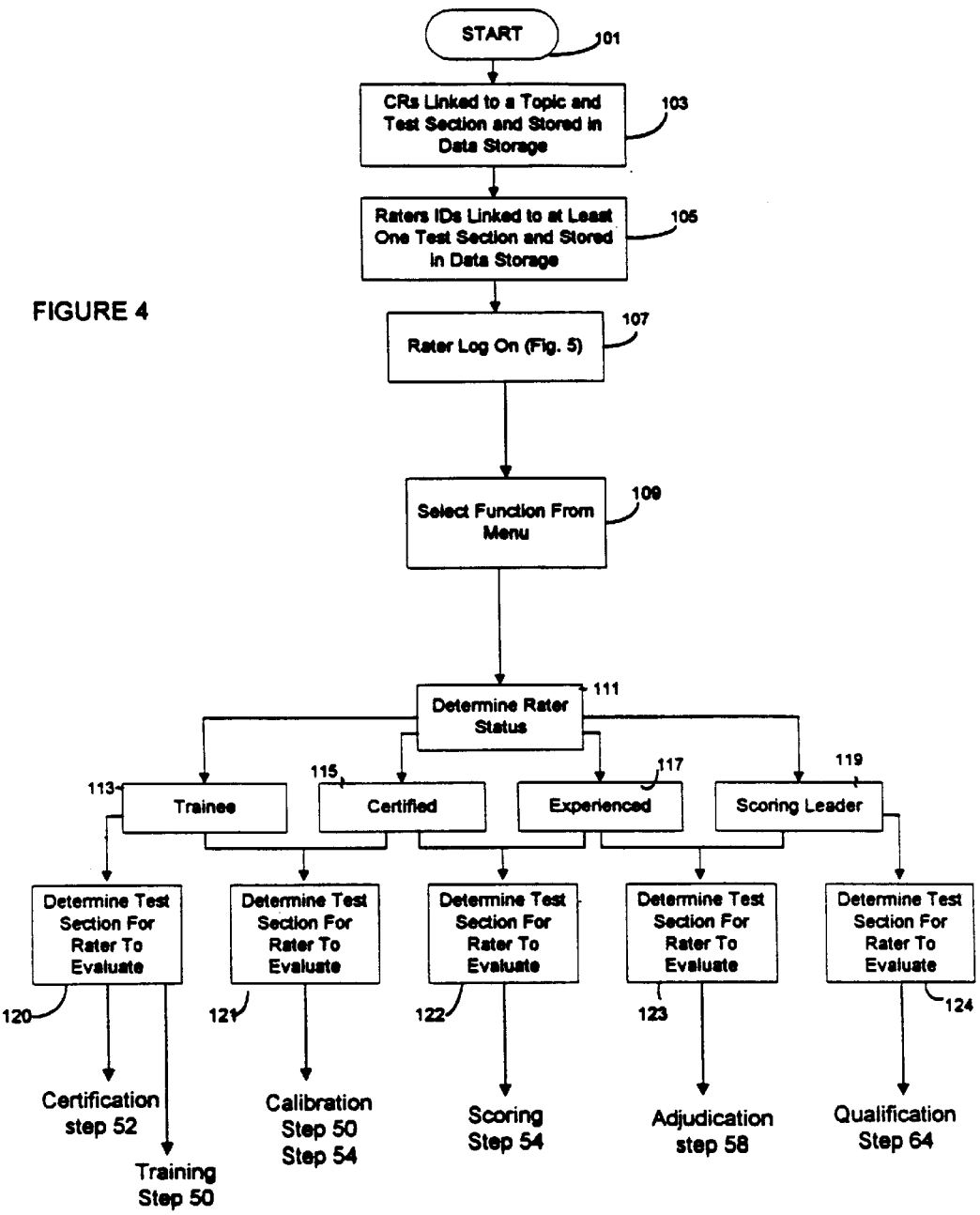
FIG. 4 shows a flowchart of the steps carried out in connection with the creation and distribution of electronic workfolders in accordance with a preferred embodiment of the invention.

FIG. 4 shows a flowchart of a method employed by the scoring system for distributing electronic workfolders of CRs to raters in accordance with a preferred embodiment of the invention. Each CR received after the administration of a test is linked to the particular topic which elicited the response and is stored in the database at step 103. In general, the CRs are assigned to a topic in a particular test section. This may be accomplished through analysis of file formatting information created concurrently with the CR creation by the test delivery or administration applications or by a post processing application. Details regarding the formatting by one such post processing system is described in U.S. Pat. No. 5,565,316, assigned to the present assignee. It should be understood that the topic assignment and relational storage carried out by the scoring system of the present invention at step 103 may be performed in a number of ways.

A rater ID for each of the raters who will be evaluating CRs is preferably entered into the database. In general, once a rater ID has been entered into the database, the rater ID is preferably linked to CRs, which, in turn, are linked to a particular topic and test section based on the qualification status of the rater. A rater may, moreover, be assigned to more than one test section. The assignment may be based on determinations made by an administrator or scoring leader. Thus, at step 105, the rater identification code is preferably linked to at least one test section and relationally stored as described above in connection with FIG. 3.

Figure 5:
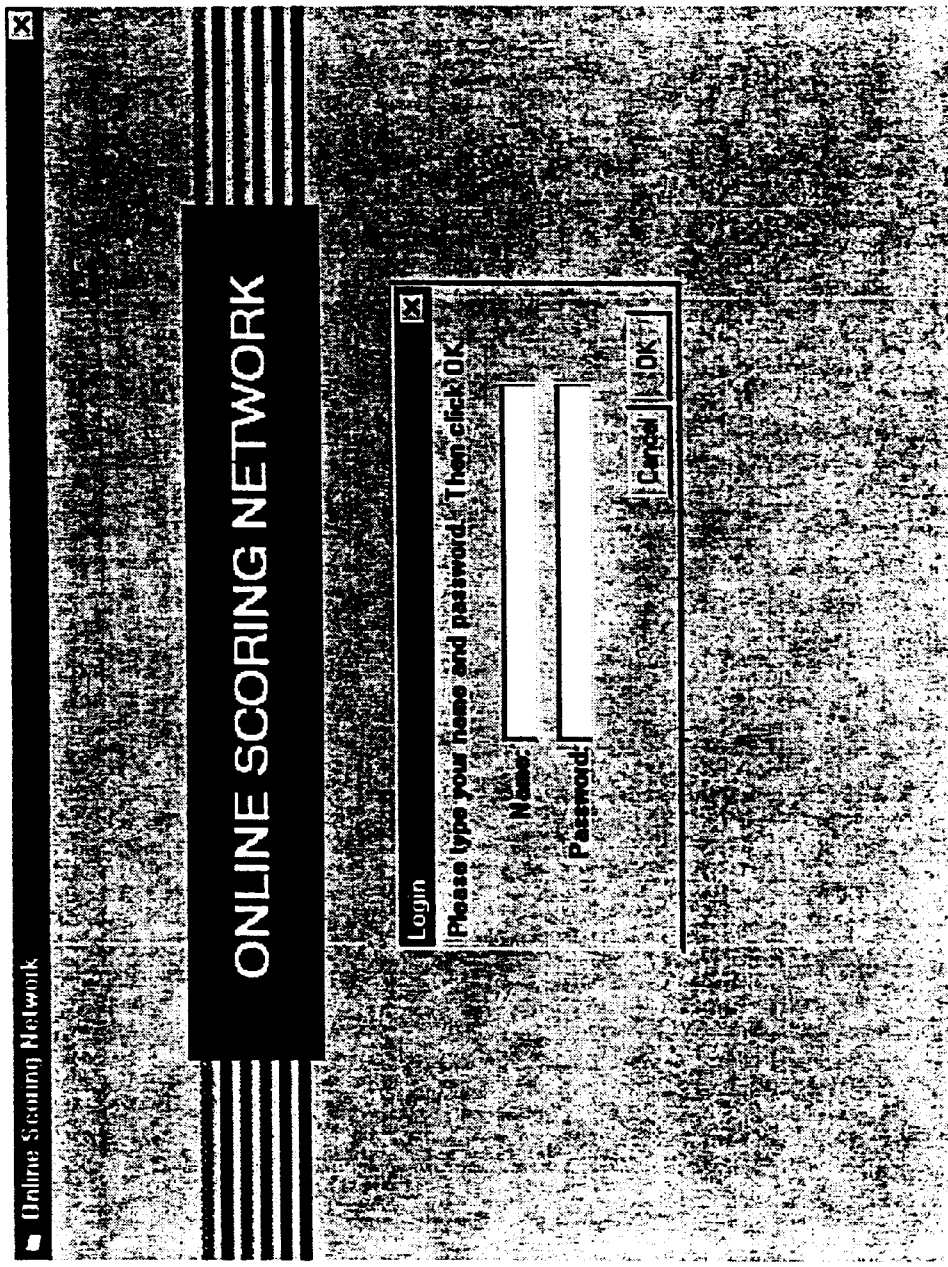
FIG. 5 shows an example of a log on screen for authorized raters.

At step 107, the rater logs on to the system at a rater station, for example, utilizing a system log on window such as the one shown in FIG. 5. Once the rater is logged onto the system the rater is defined herein as an authorized rater and the rater station is defined as an active station.

At step 109, the rater is preferably presented with a menu that may include, for example, the following options selectable by the rater: "File" which will provide the capability to print and exit; "Admin" which will provide the capability to perform certain administrative functions depending on the rater's qualification status; "Training" which will provide the rater with the capability to access training sample, calibration and certification CRs, as well as topic support for those CRs; "Scoring" which will provide the rater with the capability for selecting production CRs, adjudication CRs, or candidate sample CRs, depending upon the rater's qualification status as described below; and "Monitoring" which will provide qualified rater's the capability to review CRs and performance-related data logged in the database. The rater selects one of the options presented at step 109, and based on the rater's qualification, specific options are then presented. Therefore, the system next determines the qualification status of the authorized rater at step 111. A rater may be designated as a trainee 113, certified 115, experienced 117, or a scoring leader 119.

As discussed above, the CRs, as well as being associated with a test section, may also be assigned to various categories based on the intended use within the scoring system. For example, as described briefly above and as will be described in greater detail below in connection with FIG. 8, some CRs, designated qualified sample CRs, are assigned to categories based on their intended uses in the quality control, monitoring and training processes provided by the scoring system of the present invention. The qualified sample CRs may be designated as one or more of the following categories: certification, calibration, training sample, monitoring, benchmark and rangefinder CRs. Other constructed response categories include adjudication CRs (production CRs which have received different scores from raters assigned to evaluate the constructed response and, thus, require adjudication by a different, preferably more experienced, rater) and candidate sample CRs (production CRs which have received the same score from the first two raters assigned to evaluate the constructed response and are, thus, candidates for use as sample CRs).

The category of CRs transmitted to the rater may be based on a selection by the rater. For example, if the rater selects "training" from the above-mentioned menu, the rater is preferably presented with a screen listing those test sections for which the rater is qualified as a "trainee" and that will provide the rater with the option of selecting calibration CRs, certification CRs, or training sample CRs. Similarly, if a rater selects "Scoring" from the menu described above, a new screen is preferably displayed listing those test sections that the rater is qualified to score with options for scoring those test sections based on the rater's qualification status for each of the listed test sections. Thus at steps 120, 121, 122, 123, and 124, the rater is preferably presented with a list of test sections that the rater may select from where the list is based on the rater's qualification status as determined at step 111. Once the rater selects a particular test section, the rater can select the category of CRs to evaluate, i.e., if certified the rater may select calibration CRs or production CRs, or if a scoring leader the rater may select adjudication CRs or candidate sample CRs.

Figure 6:
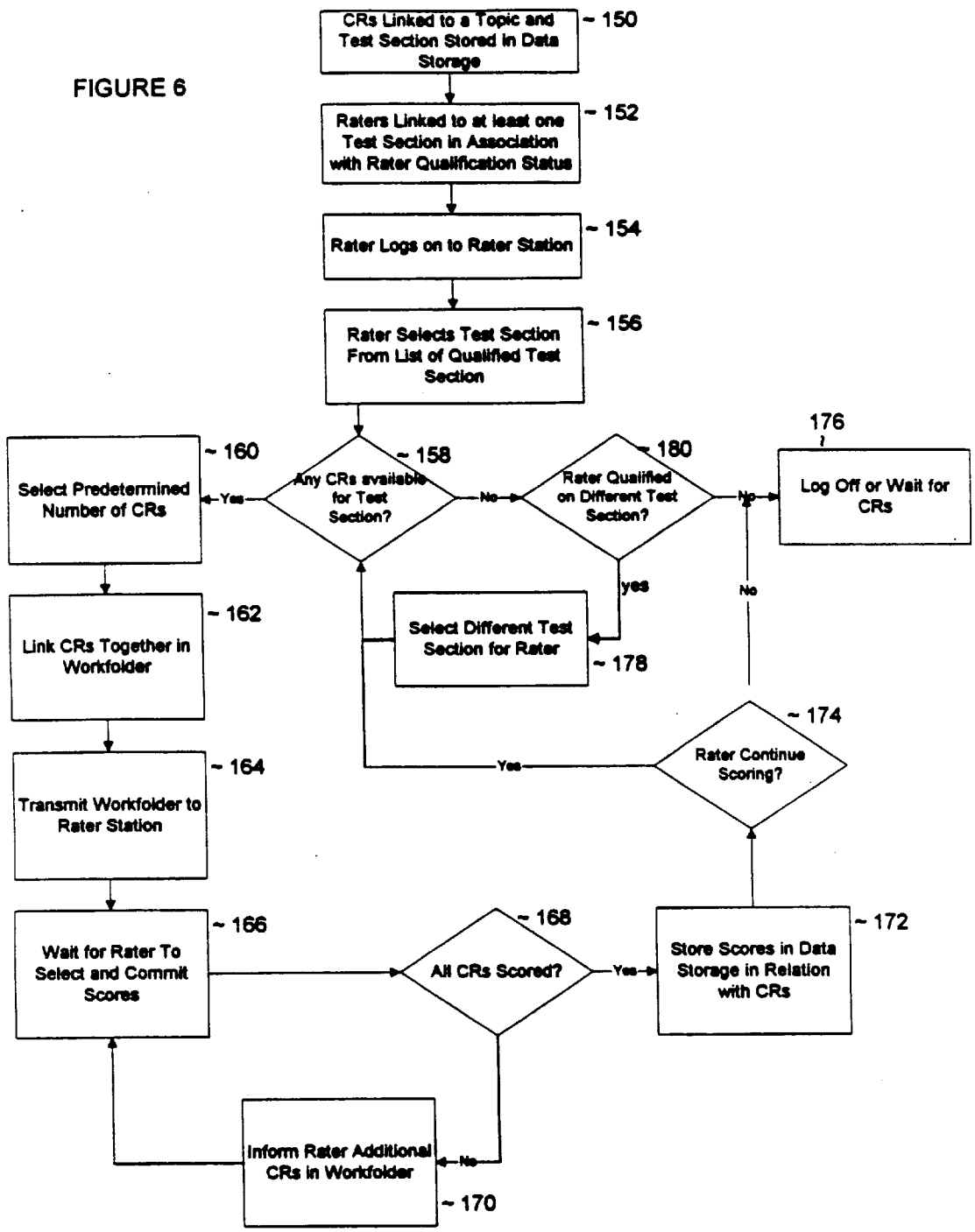
FIG. 6 shows a detailed flowchart of the steps carried out in connection with the distribution of electronic workfolders in accordance with a preferred embodiment of the present invention.

Assuming that CRs exist for the test selection selected by the authorized rater (the method used when CRs are not available is shown in the flowchart of FIG. 6), some CRs are transmitted to the active rater station, preferably, in a workfolder for the rater to evaluate and score. Which CRs are transmitted is dependent on the category selected, as well as the rater qualification status for the particular test section.

In a preferred embodiment, at least two categories of CRs may be transmitted to and evaluated by each rater for any topic for which the rater has been qualified. For example, if a rater is qualified as a trainee 113, the rater is permitted to score CRs within the certification category, the calibration category, and training sample category; if a rater is qualified as a certified rater 115, the rater is permitted to score CRs within the calibration category and the production category; if a rater is qualified as an experienced rater 117, the rater is permitted to score CRs in the production category and the adjudication category; and if the rater is qualified as a scoring leader, the rater is permitted to score CRs in the adjudication category and the candidate sample category. Therefore, based on the status of the authorized rater, the system may preferably proceed with at most two processes that are shown in FIG. 2. For instance, when the authorized rater is identified as a trainee 113, the scoring system may proceed with certification (Step 52 in FIG. 2) or calibration (training step 50 in FIG. 2). When the authorized rater is certified 115, the scoring system may proceed with calibration (scoring step 54 in FIG. 2) or actual production scoring (step 60 in FIG. 2). When the authorized rater is experienced 117, the scoring system may proceed with actual production scoring (step 54 in FIG. 2) or adjudication (step 60 in FIG. 2). Similarly, when the authorized rater is qualified as a scoring leader 119, the scoring system may proceed with adjudication (step 60 in FIG. 2) or with CR qualification (step 64 in FIG. 2).

FIG. 6 shows a more detailed flowchart of the steps carried out for the distribution of CRs. At step 150 the CRs are linked to a topic and a test section and stored in the database as described above in connection with FIG. 4. At step 152, the raters qualified to score those test sections are linked to those particular test sections and the relationships are stored in the database. At step 154, a rater logs on to a rater station as described above and becomes an authorized rater in connection with that particular rater station. Once an authorized rater has logged onto the scoring system, the rater selects a test section for which the rater is qualified based on the relationships stored in the database.

If there are any CRs available as determined at step 158 for the selected test section, the system selects a predetermined number of CRs to include in a workfolder at step 160. The selected CRs are linked together relationally in the database at step 162 to form a production workfolder as is described in detail below. The production workfolder is transmitted to the rater station at step 164. At step 166 the system waits for the rater to select, review, and score the CRs that were transmitted within the workfolder. When all of the CRs are scored, as determined at step 168, the scores are stored in relationship to the CRs at step 172. In the event that a rater attempts to commit the scores prior to scoring all of the CRs in a workfolder, the system in a preferred embodiment, informs the rater at step 170 that additional CRs are available for scoring in the workfolder. However, a scoring leader may be permitted to commit a partially scored workfolder in a more preferred embodiment.

After committing the scores, the system may prompt the rater as to whether or not the rater wishes to continue scoring. If the rater wishes to continue scoring at step 174, the system checks if any CRs are available for the currently selected test section to be scored at step 158. If so, steps 160, 162, 164, etc. are carried out again. However, if no CRs are available for the selected test section, as determined at step 158, the system checks the stored relationships between the rater and test sections to ascertain whether or not the rater is qualified to score a different test section at step 180. If so, the system may automatically select a different test section for the rater to score as shown at step 178 or the rater may select one as discussed in connection with step 156. If not, the system may prompt the rater to either log off or wait until CRs for the given test section become available as shown at step 176.

Figure 7A:
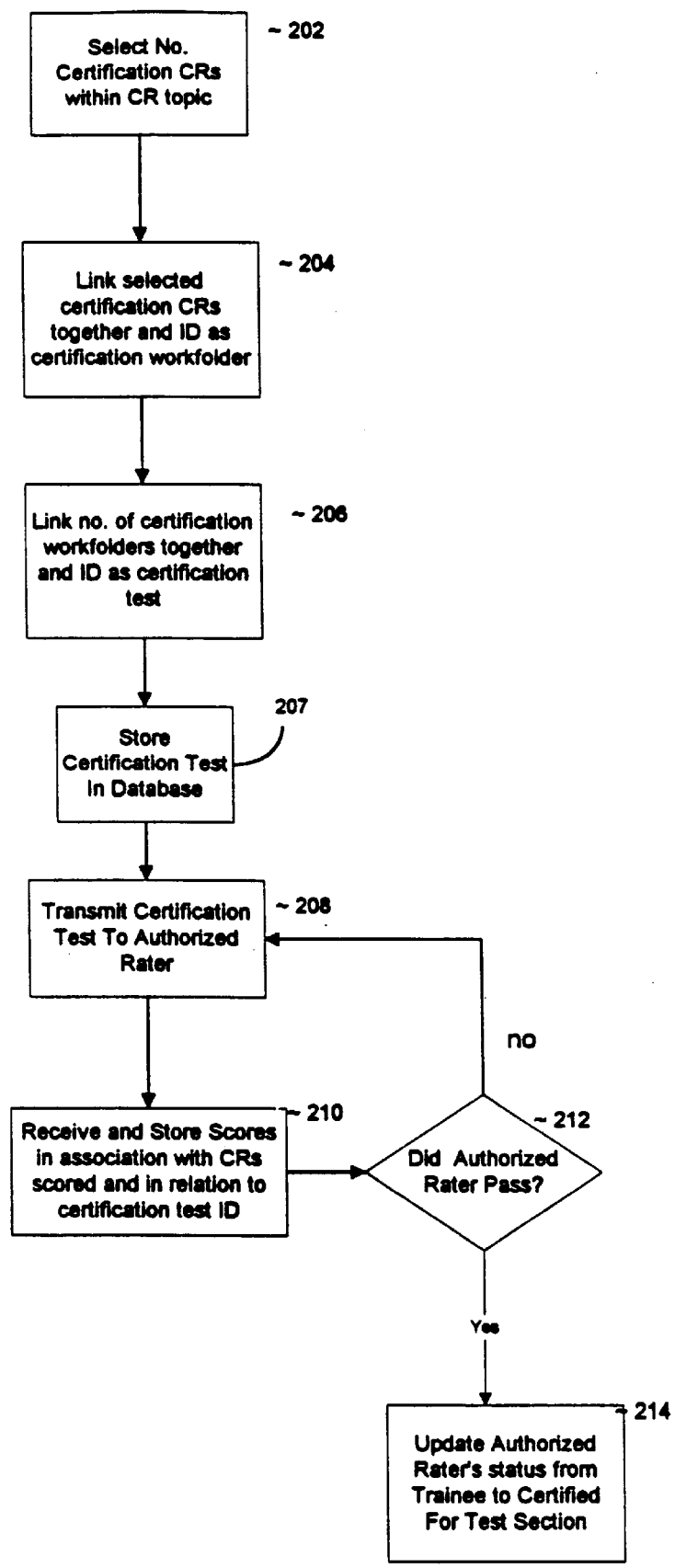
FIG. 7A shows a detailed flowchart of the steps carried out in connection with the certification process in accordance with a preferred embodiment of the present invention.

FIG. 7A shows a detailed flowchart of the steps carried out in connection with the certification process in accordance with a preferred embodiment of the present invention. In the certification process, specific categories of CRs are transmitted for the rater's evaluation and scoring. As discussed above, if a rater is a trainee, the rater may select either certification CRs or calibration CRs, and may additionally select rangefinder CRs and benchmark CRs.

In a preferred embodiment, the certification tests are assembled manually at the test developer station. In this preferred embodiment, a test developer may select a number of certification CRs from a pool of certification CRs as shown at step 202. At step 204, the test developer may link the selected certification CRs together to form a certification workfolder with a unique ID. Then at step 206, the test developer may link a number of workfolders together to form a certification test, also preferably having a unique ID. The certification test is then stored in the database at step 207 in relation to the test ID and the workfolder IDs. In this way certification tests can be available at the time the rater chooses the certification procedure. It should be understood that the scoring system in accordance with the invention could be programmed to automatically link a predetermined number of certification CRs as they become available to form workfolders, and link a predetermined number of certification workfolders together as they become available to form the certification test.

If the rater selects certification CRs, a certification test is selected, preferably one that the rater has not taken previously, and is transmitted to an authorized rater at step 208 and the certification test ID is stored in association with that rater in the database as discussed above. At step 210, the rater's scores are received and stored in association with the CRs that were scored during the certification test and in relation to the certification test ID.

Stored scores can subsequently be evaluated by the system by comparing the scores to the predetermined or qualified scores associated with the certification CRs. Based on this comparison a decision can be made as to whether or not the rater has passed the certification test for the particular test section at step 212. Whether or not a rater has passed the certification test is preferably based on criteria set forth for each of the different testing programs, e.g. GMAT, etc.. If the rater does pass the test as determined at step 212, the rater's status is preferably updated from trainee to certified for the particular test section at step 214. If the rater does not pass the certification test, the rater may take a different certification test by returning to step 208. In a preferred embodiment of the invention, the certification CRs that are selected for any new certification test are different from those previously presented to the rater in a prior certification test.

Figure 7B:
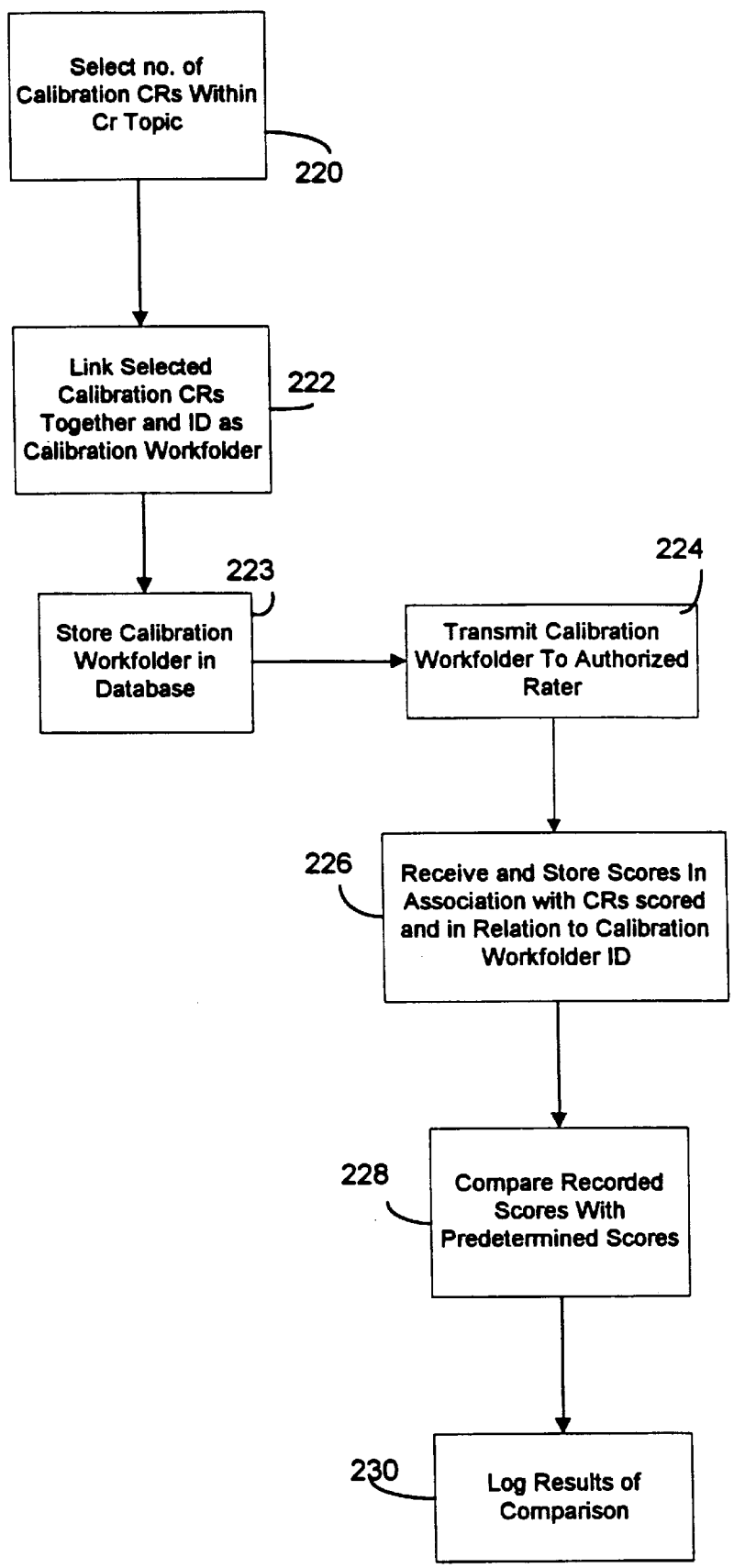
FIG. 7B shows a detailed flowchart of the steps carried out in connection with the calibration process in accordance with a preferred embodiment of the present invention.

FIG. 7B shows a detailed flowchart of the steps carried out in connection with the calibration process in accordance with a preferred embodiment of the present invention. As discussed above, calibration may be used during training (step 50 in FIG. 2) or during the scoring process itself (step 54 in FIG. 2). At step 220 in FIG. 7E, a number of calibration CRs within a particular topic are preferably selected by a test developer via test developer station. The selected calibration CRs are linked together, preferably manually, and identified as a calibration workfolder at step 222. The calibration workfolder ID is stored in the database at step 223 with the calibration workfolder CRs. In one preferred embodiment, daily calibration workfolders are created and the same are applied across all qualified raters scoring that day for a given topic or topics. If the rater selects calibration CRs, a calibration workfolder is selected from the database by the system and transmitted at step 224 to the authorized rater. After the authorized rater scores the calibration CRs within the calibration workfolder, the system receives and stores those scores in association with the CRs themselves and in relation to the calibration workfolder ID at step 226.

These stored scores can subsequently be compared by the system with those predetermined scores for the same CRs at step 228. The results of this comparison are preferably logged by the system at step 230 for further analysis.

Figure 7C:
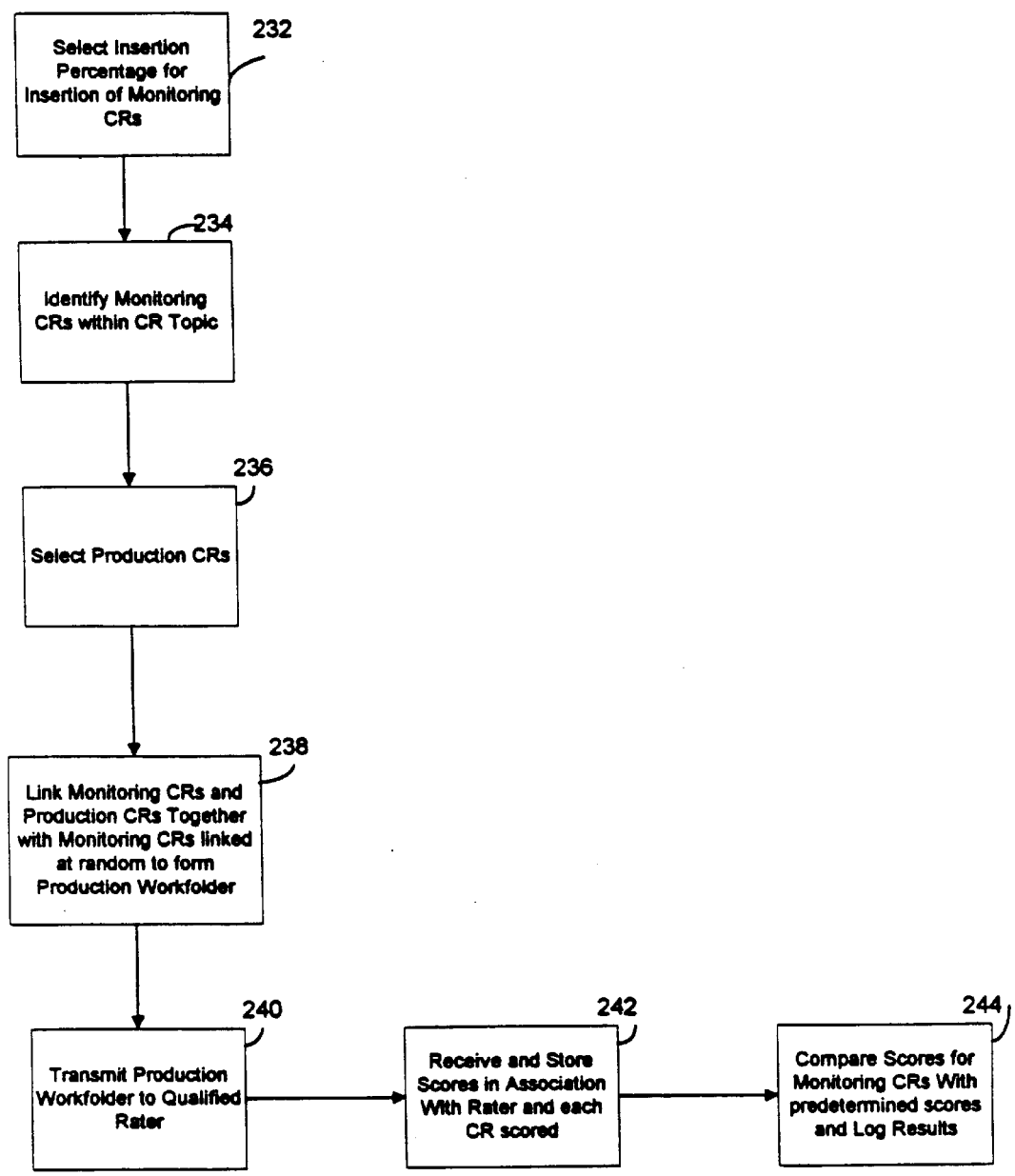
FIG. 7C shows a detailed flowchart of the steps carried out in connection with the scoring process in accordance with a preferred embodiment of the present invention.

FIG. 7C shows a detailed flowchart of the steps carried out in connection with the scoring process in accordance with a preferred embodiment of the present invention. As described above briefly, each production workfolder preferably includes a predetermined number of monitoring CRs. In such a preferred embodiment, a particular testing program may designate in advance how many monitoring CRs should be included within a production workfolder and the percentage that should randomly be inserted within the workfolder. For example, if a production workfolder is to include thirty CRs and three monitoring CRs, the workfolder should be structured to include the monitoring CRs dispersed in random fashion.

At step 232 in FIG. 7C, the percentage of monitoring CRs in a production workfolder is selected. Preferably, the parameter is selected in advance by the testing program. At step 234, the correct number of monitoring CRs within a CR test section or topic are identified. The correct number of production CRs, i.e. the total number of CRs in a production workfolder minus the number of monitoring CRs, for that workfolder are selected at step 236. At step 238, the system links the selected monitoring CRs and selected production CRs together to form the workfolder. The monitoring CRs are preferably linked at random within the production workfolder. If the rater selects production CRs, the production workfolder is then transmitted to a qualified rater at step 240. As discussed above, the qualified rater should at least have a qualification status as a certified rater. After the rater has scored the production workfolder the scores are received and stored in association with the rater's ID and each CR itself in the database at step 242.

In a preferred embodiment, the scores associated with the monitoring CRs are compared with the predetermined scores for the same CRs and the results of the comparison logged for further analysis at step 244. Specifically, the comparison of scores for monitoring CRs may be used to monitor the reliability and quality of a rater's scoring.

Figure 7D:
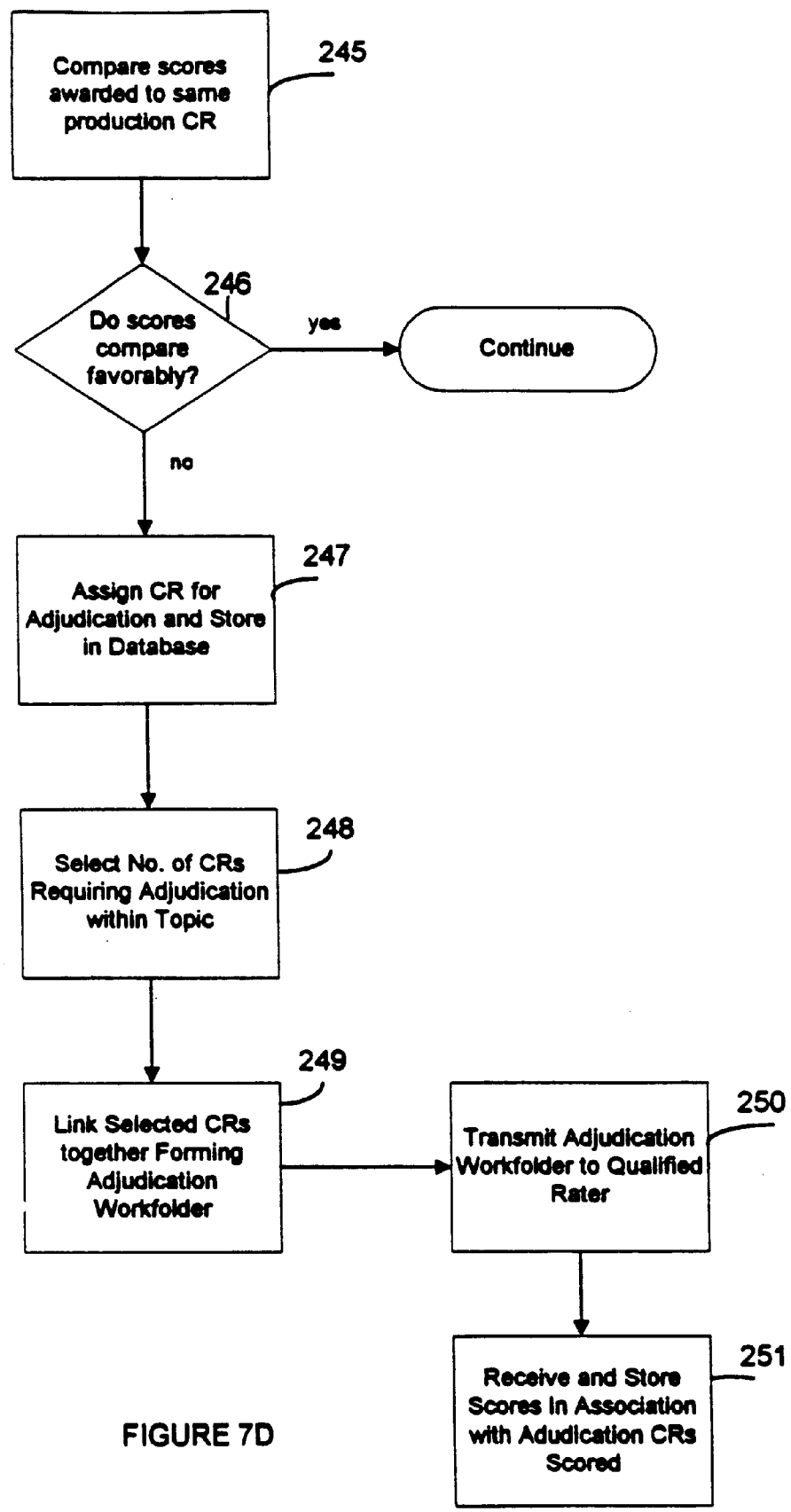
FIG. 7D shows a detailed flowchart of the steps carried out in connection with the adjudication process in accordance with a preferred embodiment of the present invention.

FIG. 7D shows a detailed flowchart of the steps carried out in connection with the adjudication process in accordance with a preferred embodiment of the present invention. As discussed above in connection with FIG. 7C, the scores are logged in connection with each CR after being scored. The system at step 245 may compare those scores which were awarded by at least two different raters, or for a score awarded by at least one rater and a score awarded by an automatic scoring system, for the same production CR to determine whether or not the scores compare favorably. If the scores compare favorably, as determined at step 246, the CR may be assigned a particular score based on criteria supplied by the testing program. However, if the scores do not compare favorably as determined at step 246, the CR is preferably assigned for adjudication and stored in the database at step 247.

The system preferably selects a number of CRs requiring adjudication within a given test section at step 248. These selected CRs are linked together to form an adjudication workfolder at step 249. If a qualified rater selects adjudication CRs, an adjudication workfolder is then transmitted to the qualified rater at step 250. As discussed above, a qualified rater is preferably one who has a qualification status as an experienced rater or scoring leader. The adjudication CRs are then scored and the scores received are stored by the system linked with the adjudication CRs themselves and in connection with the rater ID of the rater who scored them at step 251.

Figure 7E:
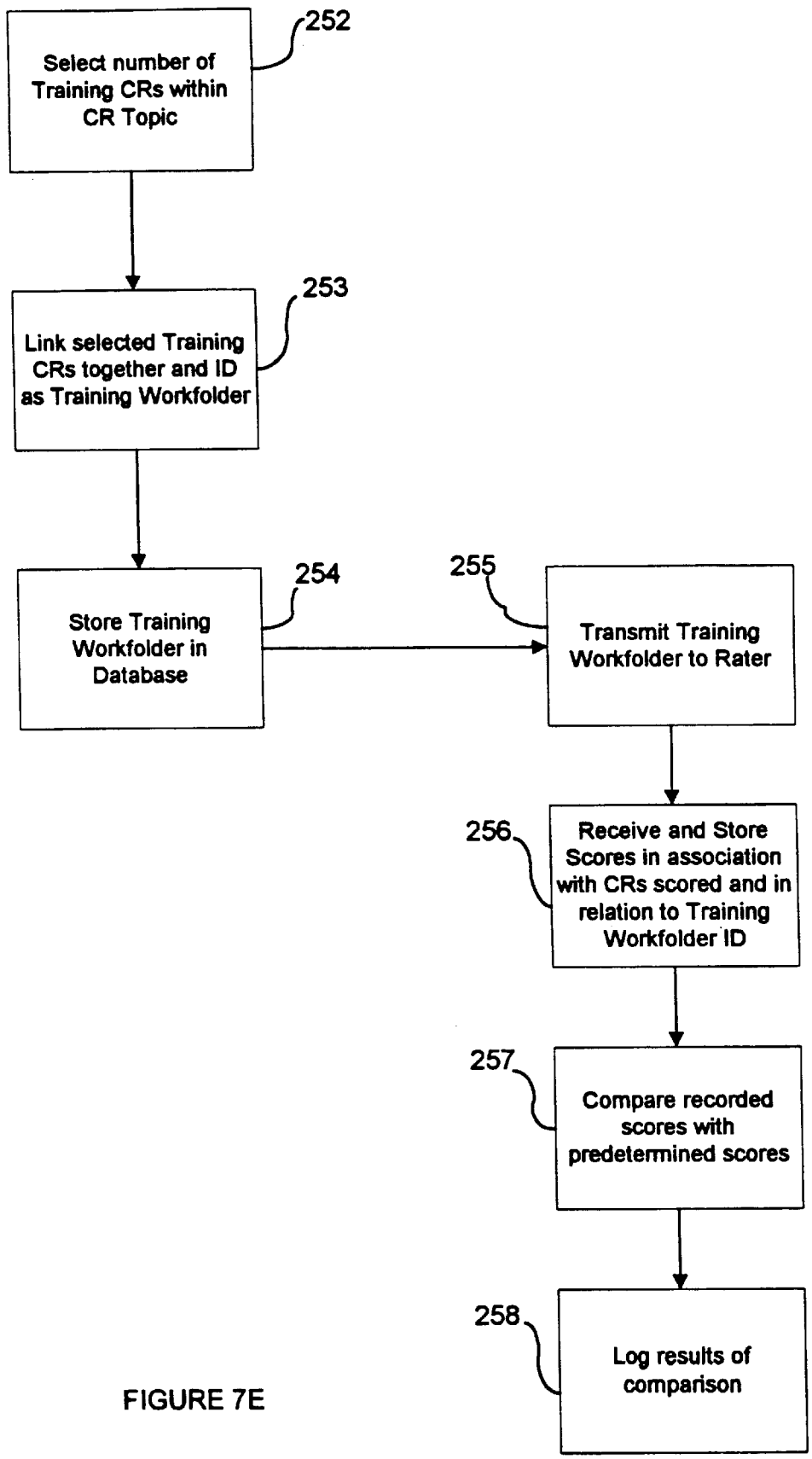
FIG. 7E shows a detailed flowchart of the steps carried out in connection with the training sample process in accordance with a preferred embodiment of the present invention.

FIG. 7E shows a detailed flowchart of the steps carried out in connection with the training sample process in accordance with a preferred embodiment of the present invention. As discussed above, training sample CRs may be used during training (step 50 in FIG. 2). At step 252, in FIG. 7E, a number of training sample CRs within a particular topic are preferably selected by a test developer via test developer station. The selected training sample CRs are linked together, preferably manually, and identified as a training sample workfolder at step 253. The training sample workfolder ID is stored in the database at step 254 with the training sample workfolder CRs. When the rater selects a training sample workfolder, the training sample workfolder is retrieved from the database by the system and transmitted at step 255 to the authorized rater. After the authorized rater scores the training sample CRs within the training sample workfolder, the system receives and stores those scores in association with the CRs themselves and in relation to the training workfolder ID at step 256.

These stored scores can subsequently be compared by the system with those predetermined scores for the same CRs at step 257. The results of this comparison are preferably logged by the system at step 258 for further analysis.

The testing programs in a preferred embodiment determine the criteria to apply to determine whether or not scores among different raters compare favorably. It is also preferred that the testing programs specify what score is ultimately assigned to a given CR based on the various scores that may be provided by different raters, e.g., the average among the scores awarded, the median among awarded scores, any two scores that are the same of three scores awarded, etc.

Figure 8:
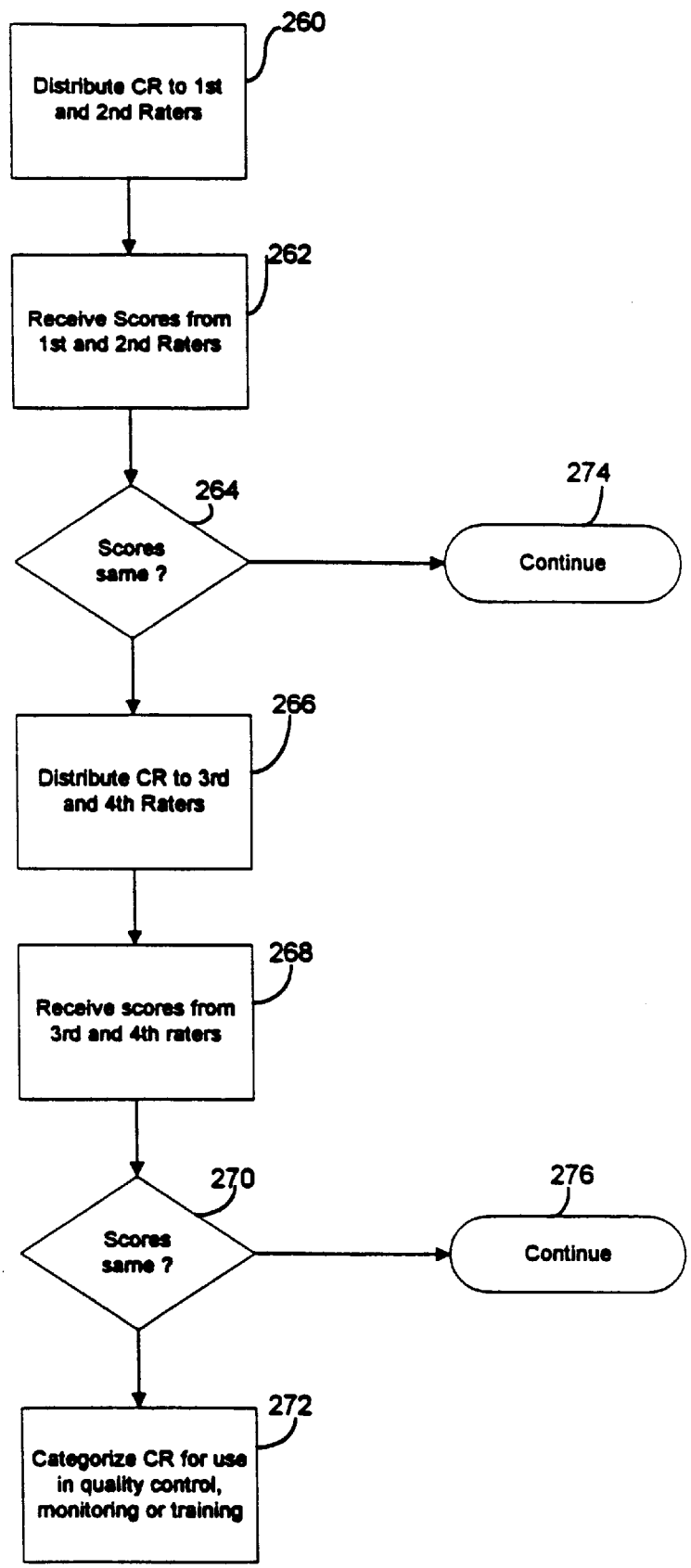
FIG. 8 shows a detailed flowchart of the steps carried out for the sample CR qualification process in accordance with a preferred embodiment of the present invention.

FIG. 8 shows a detailed flowchart of the steps carried out for the sample CR qualification process (step 64 in FIG. 2) in accordance with a preferred embodiment of the invention. As discussed above, in a preferred embodiment, each CR is transmitted to at least two raters. As shown at step 260 a selected CR is distributed to a first and second rater. At step 262 the scores awarded by each of the first and second raters are stored in data storage in association with the CRs that were scored. The system compares the two scores at step 264 to determine if the scores awarded by each of the first and second rater are the same. If the scores awarded are determined to be the same, the CR is designated as a candidate sample CR and distributed to third and fourth raters at step 266. In a further preferred embodiment, the third and fourth raters are preferably scoring leaders and more preferably located at different scoring centers. The third and fourth raters score the candidate sample CRs and the system stores those scores in association with the candidate sample CRs at step 268. If the third and fourth raters score the candidate sample CR the same as determined at 270, then the candidate sample CR is then qualified as a sample CR for use in quality control, monitoring or training by the computer scoring system at step 272. If either the first and second raters or the third and fourth raters do not provide the same score for the same CR, the procedure continues to identify other possible candidate sample CRs. It should be understood that different numbers of raters could be used, as well as more stages of comparison in the CR qualification processes. Moreover, it should further be understood that different criteria may be used in comparing the raters' scores in determining whether or not the CR can be qualified as a sample CR. Still further comparisons between at least one rater's score and a score awarded by an automatic scoring system may also be used in the process for identifying candidate sample CRs and/or qualified sample CRs.

Figure 9:
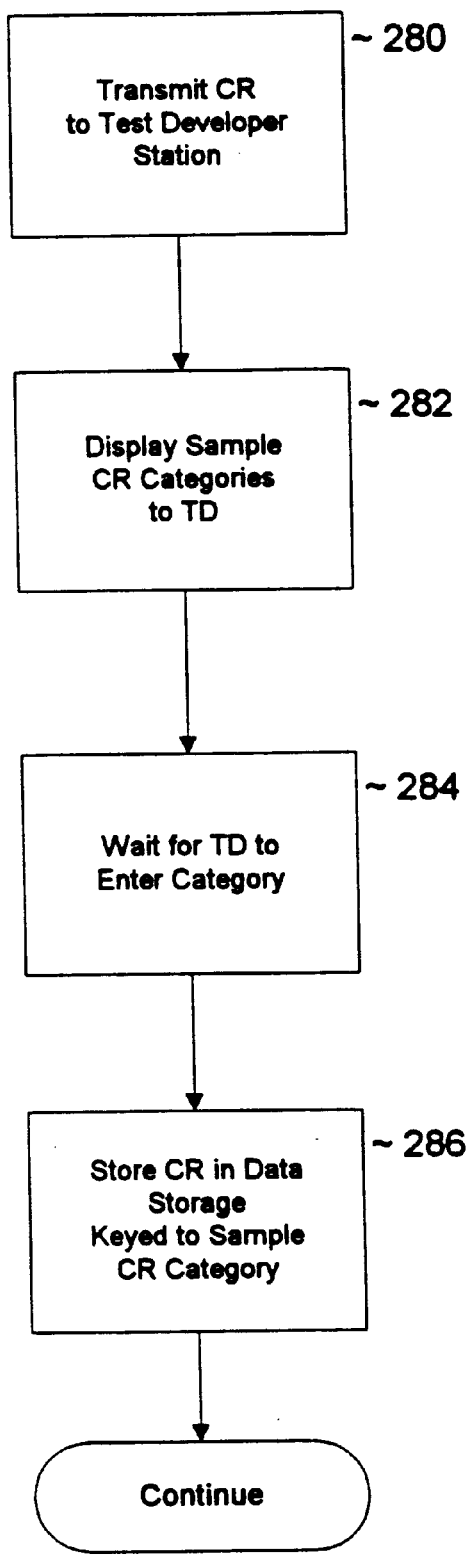
FIG. 9 shows a flowchart of the CR categorization process in accordance with a preferred embodiment of the present invention.

FIG. 9 shows a flowchart of the CR categorization process (step 66 in FIG. 2) in accordance with a preferred embodiment of the present invention. At step 280, the qualified sample CRs are transmitted to, preferably, a test developer station. The test developers may operate the test development station to display the qualified sample CRs for their review at step 282. The test developer then may interact with the test development station to assign a particular category to the sample CR at step 284. As discussed above, some of the categories may include, for example, calibration, certification, monitoring, rangefinder or benchmark CRs. At step 286, the CRs are then stored in data storage in association with the assigned category. It should be understood that categorization could be provided by scoring leaders or other designated personnel using rater stations in addition to test development stations.

Figure 10:
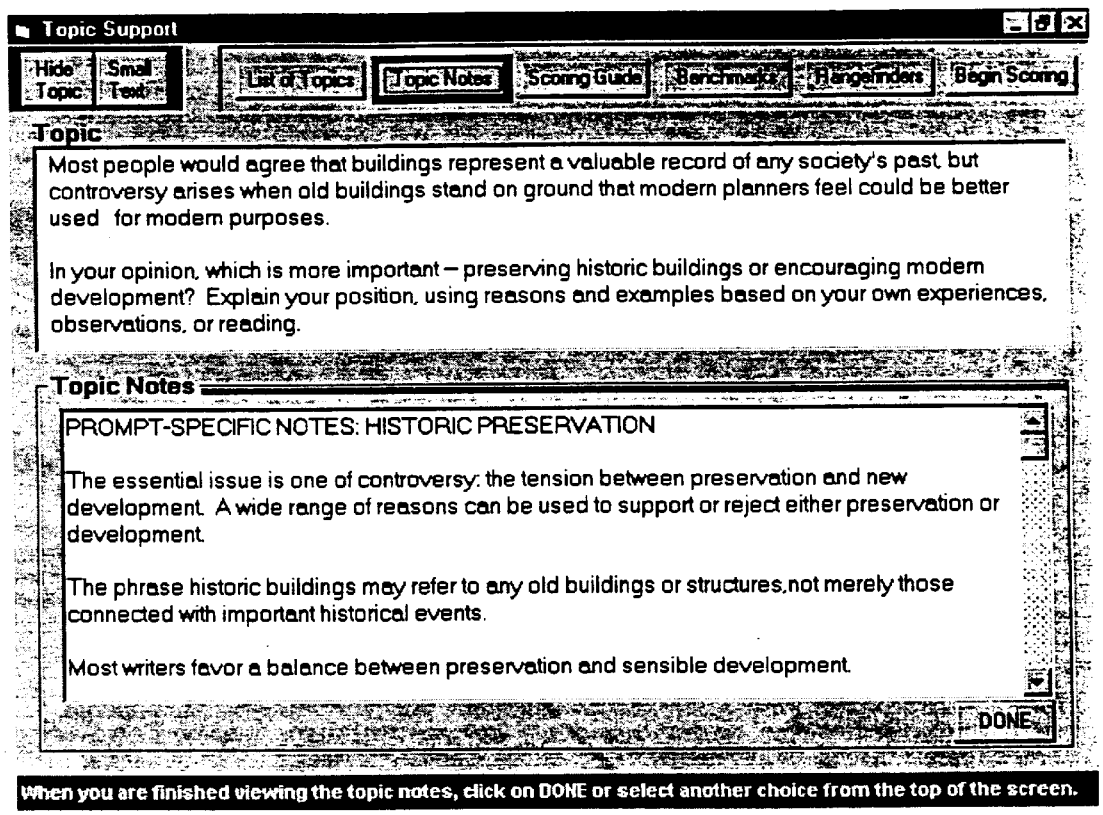
FIG. 10 shows a display of topic specific notes that may be requested by the rater and used to provide specific background information relating to the selected topic.
Figure 11:
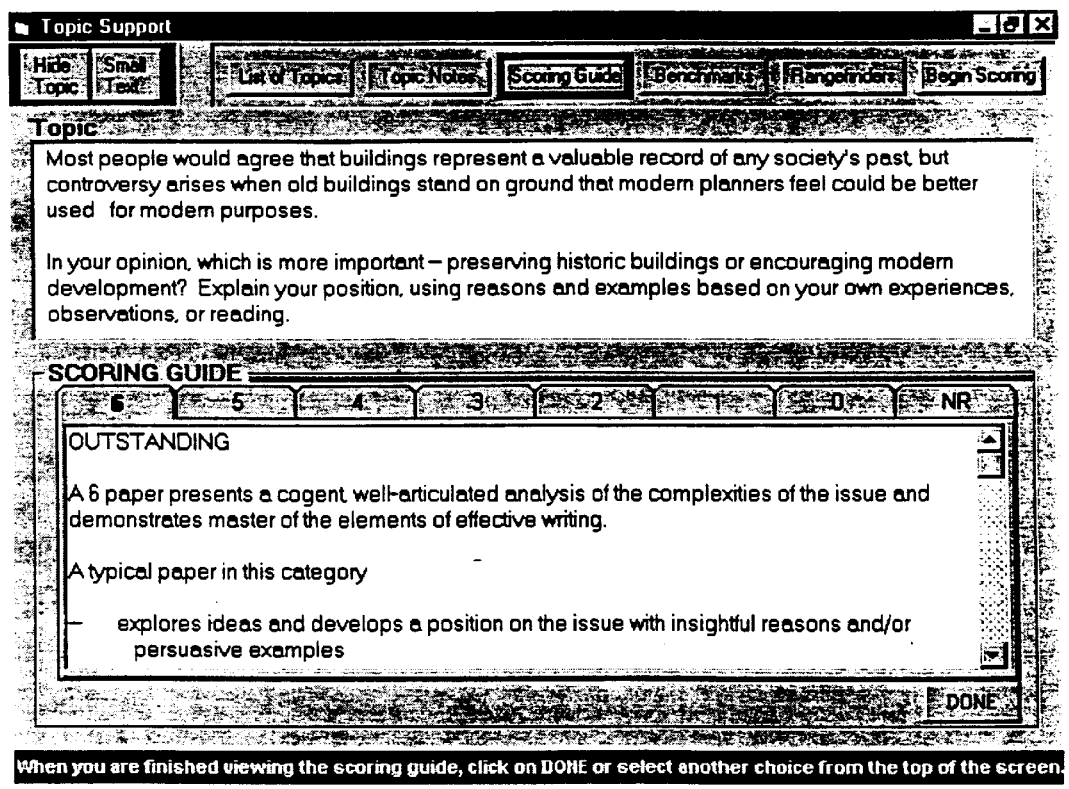
FIG. 11 shows a display of the scoring criteria for awarding various scores to a CR for the selected topic.
Figure 12:
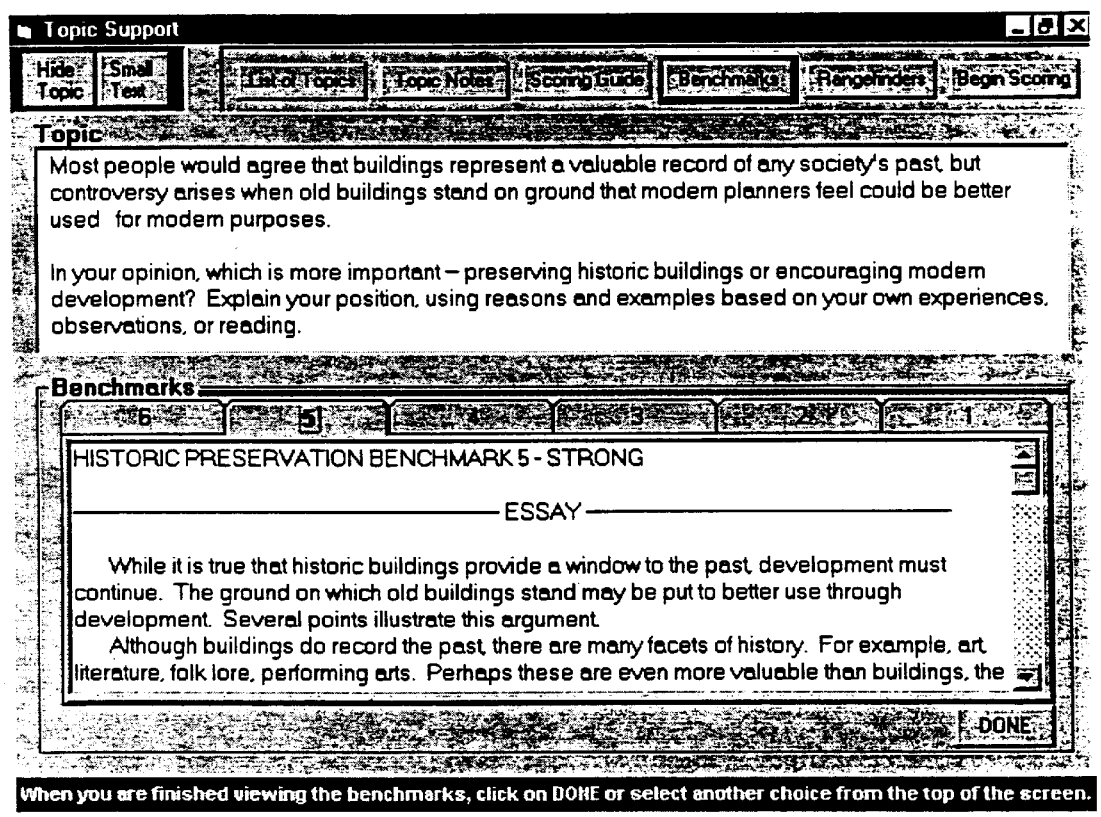
FIG. 12 shows an example of a benchmark CR display.
Figure 13:
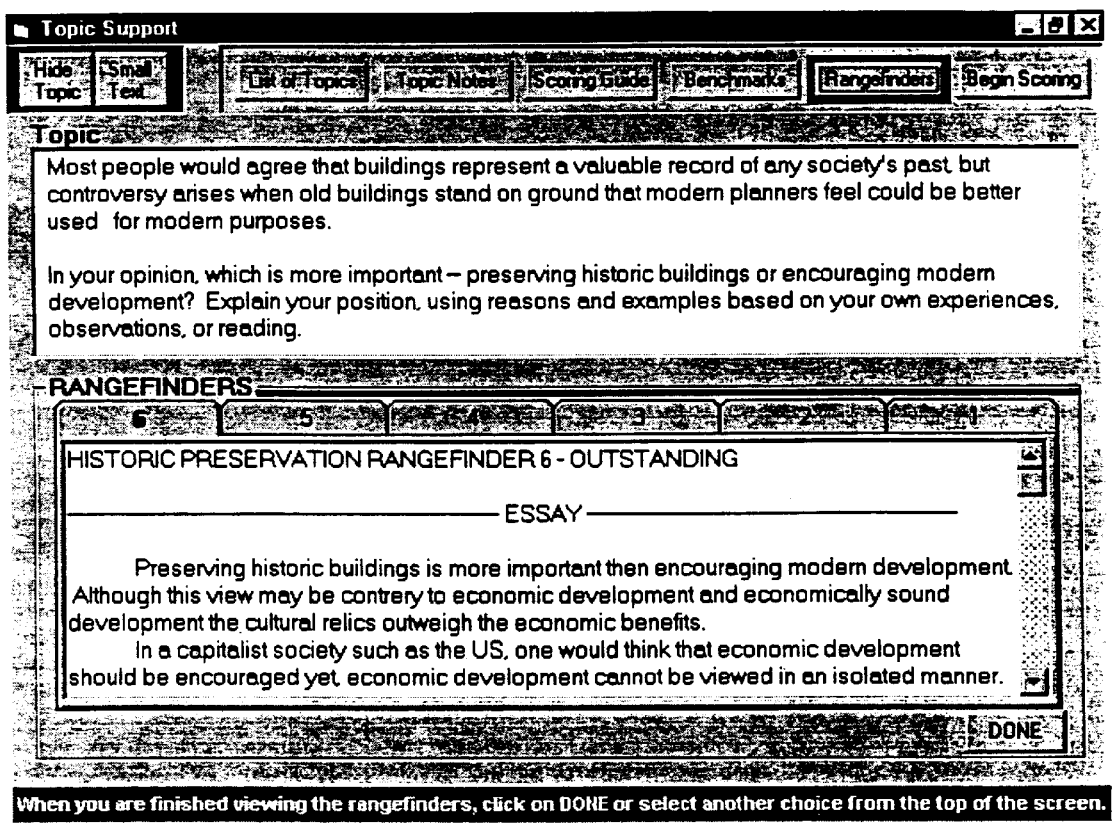
FIG. 13 shows an example of a rangefinder CR display.

FIGS. 10, 11, 12 and 13 show various information that may displayed at the rater station during a scoring training session. FIG. 10 shows a display of topic specific notes that may be requested by the rater and used to provide specific background information relating to the assigned topic. As shown in FIG. 10, the button "Topic Notes" is selected by the rater to access the displayed information. FIG. 11 shows a display of the scoring criteria for awarding various scores to a CR for the selected topic. As shown, the "Scoring Guide" button has been selected as well as the score of "6" to access the displayed information. FIG. 12 shows an example of a benchmark CR. As shown the benchmark CR displayed is for a score of "5" for the assigned topic and is accessed by selecting both the "Benchmark" button and the score of "5" button. Similarly, FIG. 13 shows an example of a rangefinder CR. As shown the rangefinder CR displayed is for a score of "6" for the assigned topic and is accessed by selecting the "Rangefinder" button.

Figure 14:
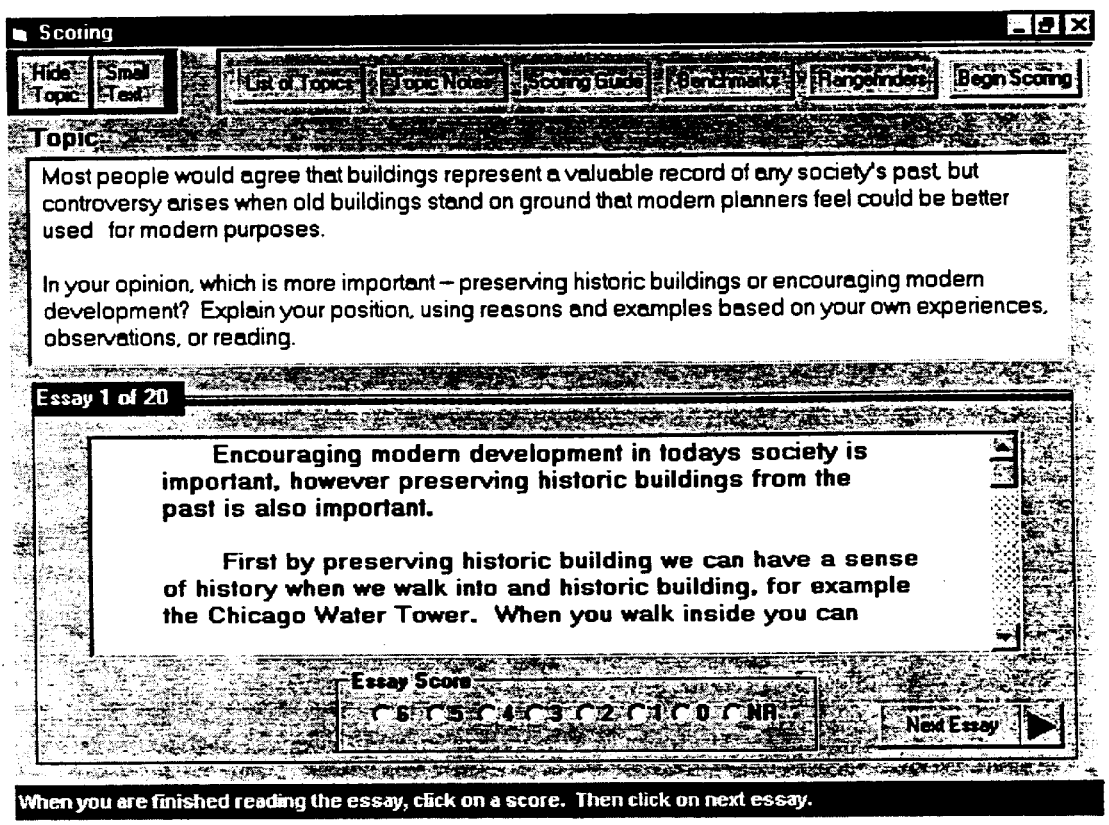
FIG. 14 shows the first CR presented to the rater at the rater station from a workfolder of twenty CRs.
Figure 15:
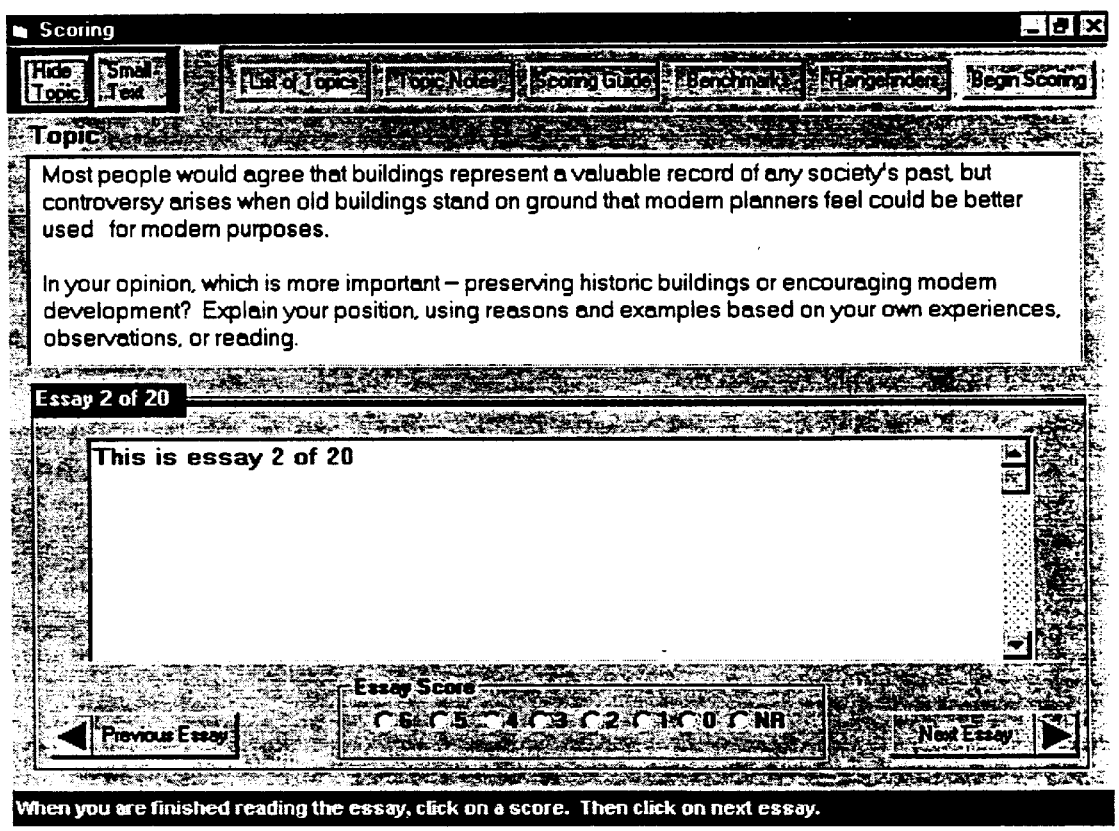
FIG. 15 shows the presentation of the second CR out of the workfolder of twenty CRs.
Figure 16:
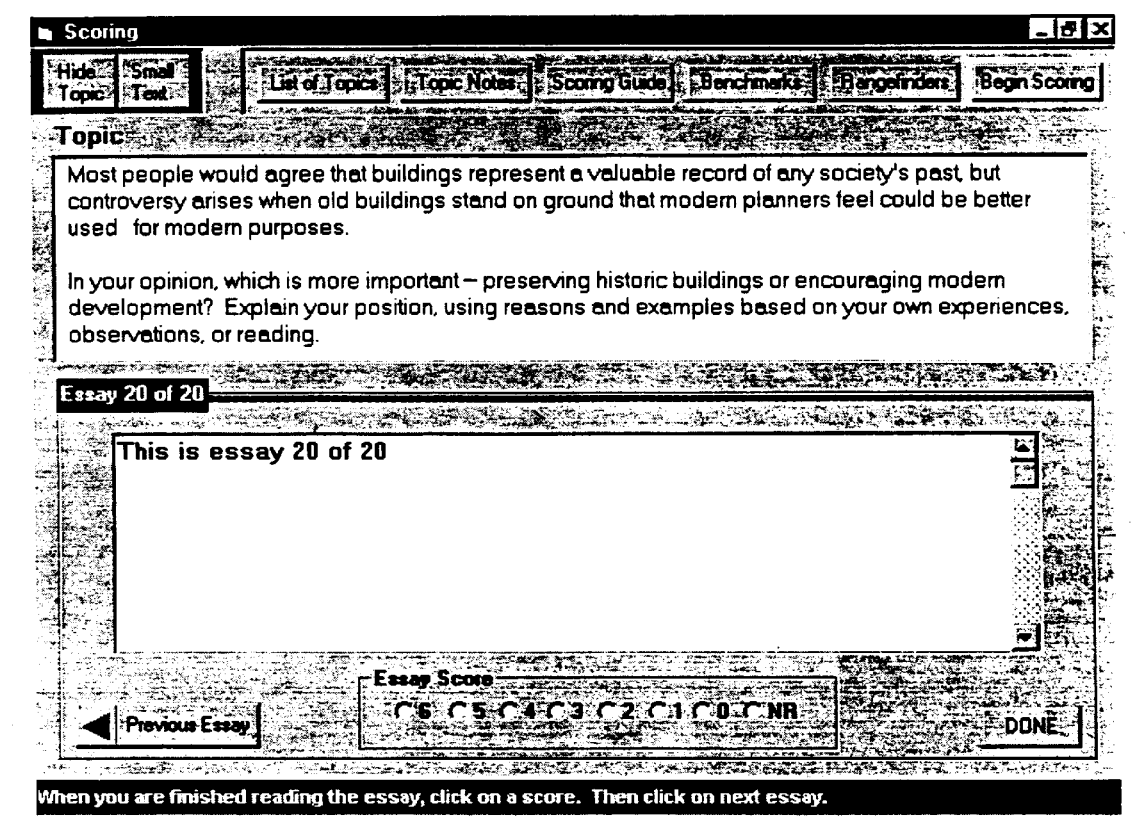

FIGS. 14–18 show various rater controls for manipulating the CR presentation at the rater station. For instance, FIG. 14, shows the first CR presented to the rater at the rater station from a work folder of 20 CRs. The "Next Essay" button may be selected to present the second CR. A score may be entered by clicking a mouse button on the desired score displayed in the "Essay Score" box. FIG. 15 shows the presentation of the second CR out of the workfolder of 20 CRs. When the last CR in the workfolder is presented as shown in FIG. 16, the rater may commit the scores for the workfolder by selecting the "Done" button or may return to the previous CR in the workfolder by clicking on the "Previous Essay" button.

Figure 18:
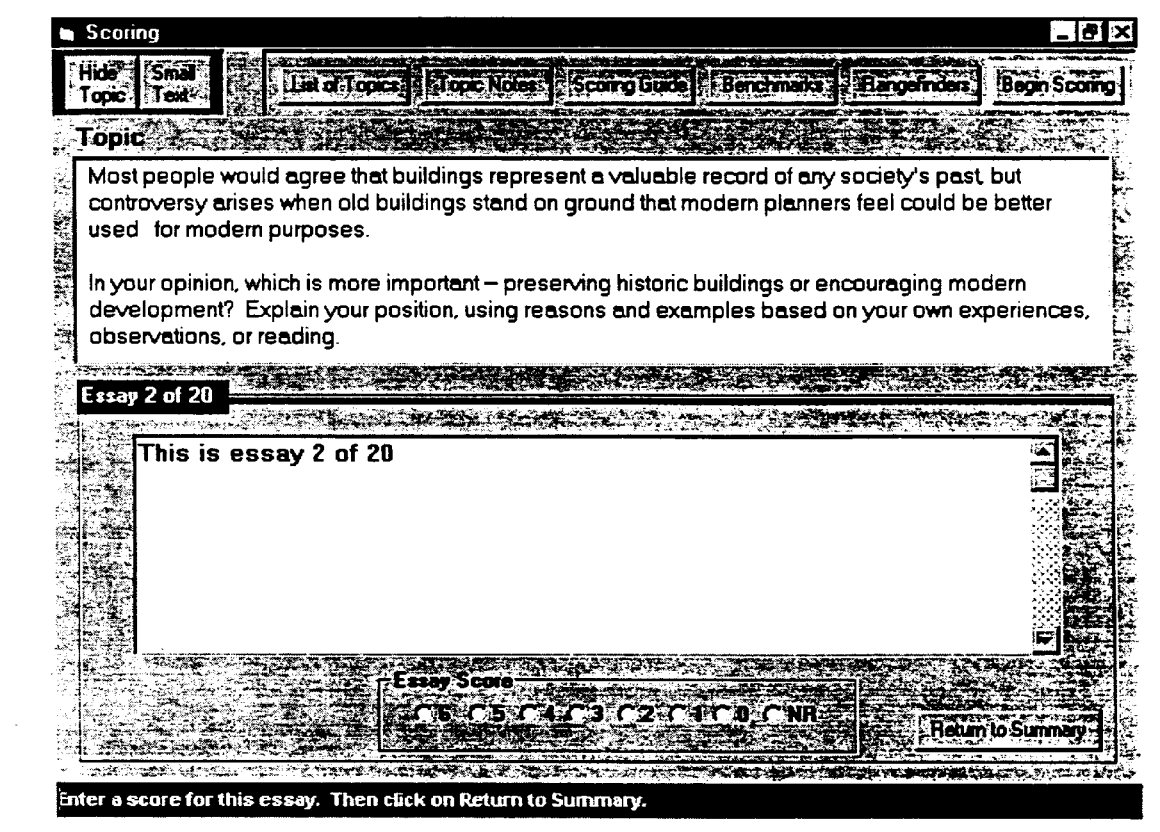

FIG. 17 shows a score summary display. Those CRs in the workfolder which did not receive a score are highlighted. As shown in the Figure, the rater may select any of the CRs to return and reevaluate the score awarded. In a preferred embodiment, the workfolder cannot be committed until all of the CRs have been awarded a score. Thus a rater would access the score summary to return to any unscored CRs in the workfolder. FIG. 18 shows a display of a CR that has been selected from the score summary display. To return to the score summary, the rater selects the "Return to Summary" button. When the "Done" button is selected from the score summary display, the scores for the workfolder are committed to the scoring system and stored as described hereinabove.

The preferred embodiment provides several unique monitoring features in addition to those described above. In particular, the system captures data on a wide variety of rater and system transactions. This data may be incorporated into reports immediately upon capture by the system, i.e. the data is available in "real time." For example, when a rater closes a workfolder, statistics regarding the rater's scoring of the particular workfolder is available immediately thereafter. In addition, the system provides the novel feature of providing cumulative statistics for individuals, for entire scoring centers, and even across all scoring centers. For example, in contrast to prior art systems which capture statistical information only during a specified scoring session, the present system captures statistical information on rater performance from the time of certification onward. Certification results become part of a rater's permanent record; each rater's daily calibration results are part of the permanent record. The present system captures cumulative topic performance data in real time across all topics in the system beginning with the initial scoring session. The system is a cumulative repository for all rater and topic performance data; previous systems are neither cumulative nor real time. In the present system, all topic and reader statistics are accessible to all scoring leaders and test developers at all time in all scoring or onsite locations. Thus, the present system provides immediate, cumulative statistics on rater and topic performance.

The data may be accessed by various individuals depending upon their status in the system. For example, scoring leaders access data for their associated raters at their scoring center. A scoring center coordinator may use the monitoring tasks for administrative purposes such as scheduling raters. The network manager and test development staff may use the statistical reports to monitor individual and overall scoring performance across all scoring centers.

Generally, the monitoring data collected by the system can be formatted into reports reflecting four subject matter areas: rater performance; topic performance summary; essay volumes; and candidate sample volumes.

Figure 19:
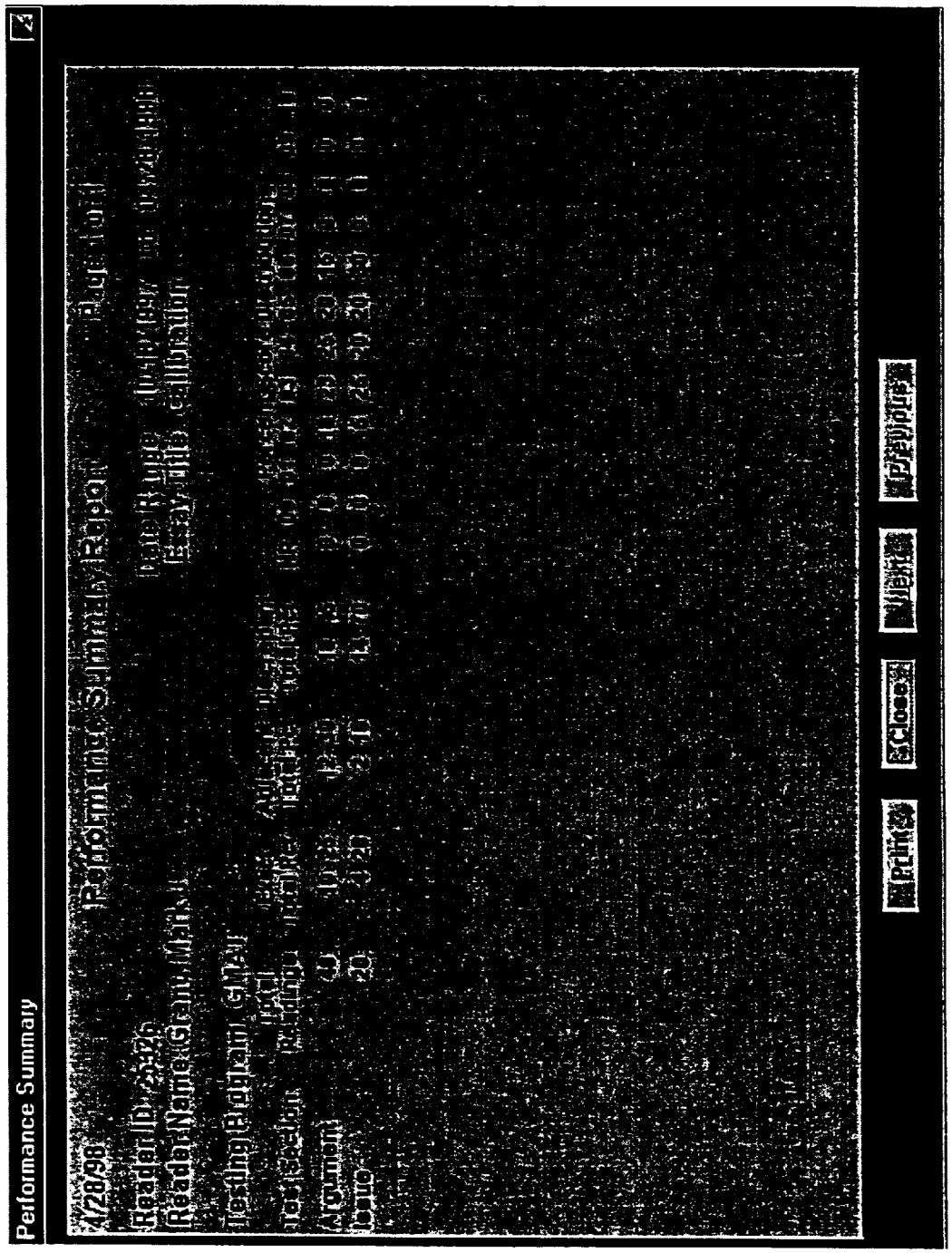
FIG. 19 is an example of a rater performance summary report generated using the system monitoring functionality.

Typically, rater performance reports are used by a scoring leader to review the scores awarded to essays by individual raters at a scoring center. An example report of this type is shown in FIG. 19. As shown, the rater performance report contains data regarding an individual rater's performance for his/her workfolders handled in a specified date range. The data include: the total number of essays scored; the total number of essays with scores exactly equal to the score given by another rater; the percentage of total number of essays scored by the rater with scores exactly equal to the score given by another rater; the number of essays given scores adjacent to the scores given by another rater; the percentage of total number of essays scored by the rater with scores adjacent to the scores given by another rater; the number of essays give scores that are discrepant from the scores given by another; the percentage of total number of essays scored by the rater with scores discrepant from those scores given by another; and the percentage score distribution. The data may further include: a beginning and ending date indicating the period on which is being reported; the day on which the rater scored a particular essay in the folder; a testing program identifier indicating the program for which the workfolder is being scored; the particular test section to which the workfolder belongs; an item code uniquely identifying a specific topic in the testing program; an item name identifying the topic in a testing program; and a folder number identifying a specific workfolder.

Figure 20:
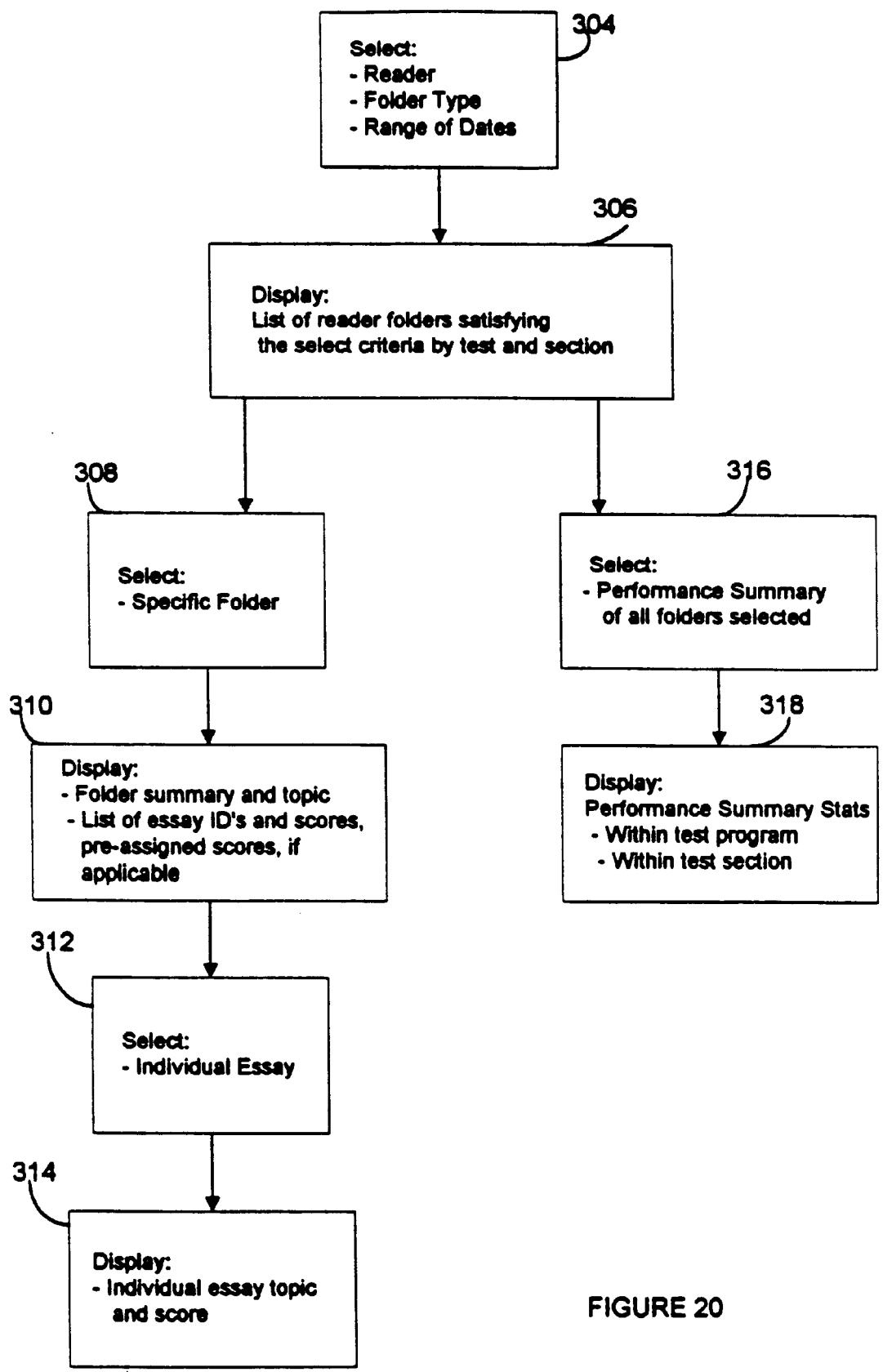
FIG. 20 is a flow diagram of the process used to generate a rater performance summary report such as that shown in FIG. 21 using the present system.

FIG. 20 provides a flow diagram depicting a process for producing a rater performance summary report such as that shown in FIG. 19. The report is generated by selecting at step 304 from the appropriate system screens, a rater, a folder type, and a range of dates. At step 306, the system displays a list of rater folders satisfying the selection criteria. The operator may select a specific folder from the list at step 308. In response to the user selection, at step 310 the system displays a folder summary and a list of essays and assigned scores for the selected folder. At step 312 the operator may select one of the listed essays. The system displays the selected essay topic and score for the selected essay at step 314. At step 306, when the system displays a list of folders satisfying the selection criteria, the operator may at step 316 select to view a performance summary of all folders. If the operator so chooses, at step 318 the system displays performance summary statistics broken down by test program and test section.

Figure 21:
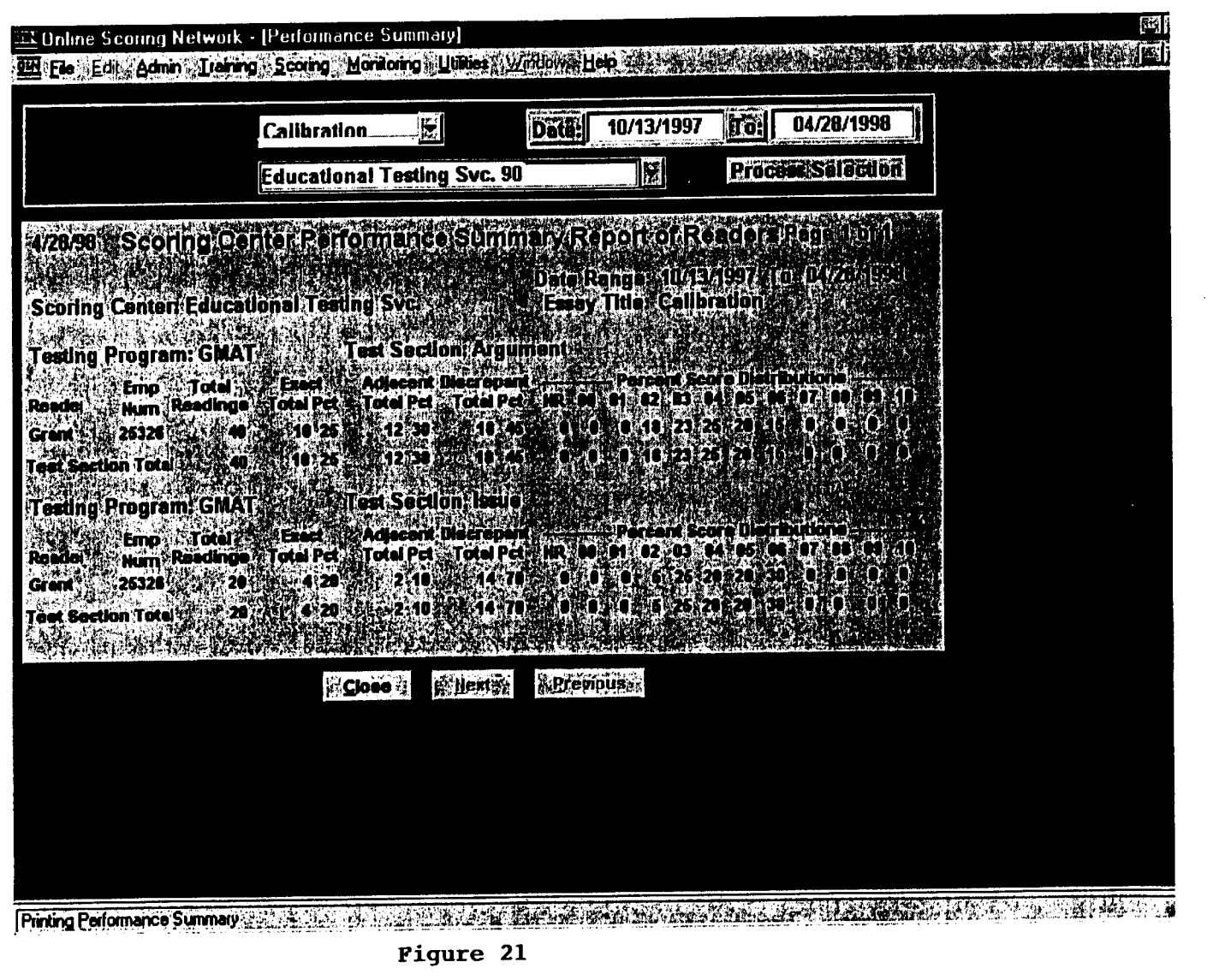

Rater and topic performance summary data can be formatted into reports focusing on scoring center rater performance, network topic performance, or scoring center topics performance. Scoring center rater reports provide the capability to review rater performance for an entire scoring center. An example of such a report is shown in FIG. 21. The data is organized by testing program, topic or test section, and rater. For each rater, the data include: the total number of essays scored; the total number of essays with scores exactly equal to the score given by another rater; the percentage of total number of essays scored by the rater with scores exactly equal to the score given by another rater; the number of essays given scores adjacent to the scores given by another rater; the percentage of total number of essays scored by the rater with scores adjacent to the scores given by another rater; the number of essays given scores that are discrepant from the scores given by another; the percentage of total number of essays scored by the rater with scores discrepant from those scores given by another; and the percentage score distribution.

Figure 22:
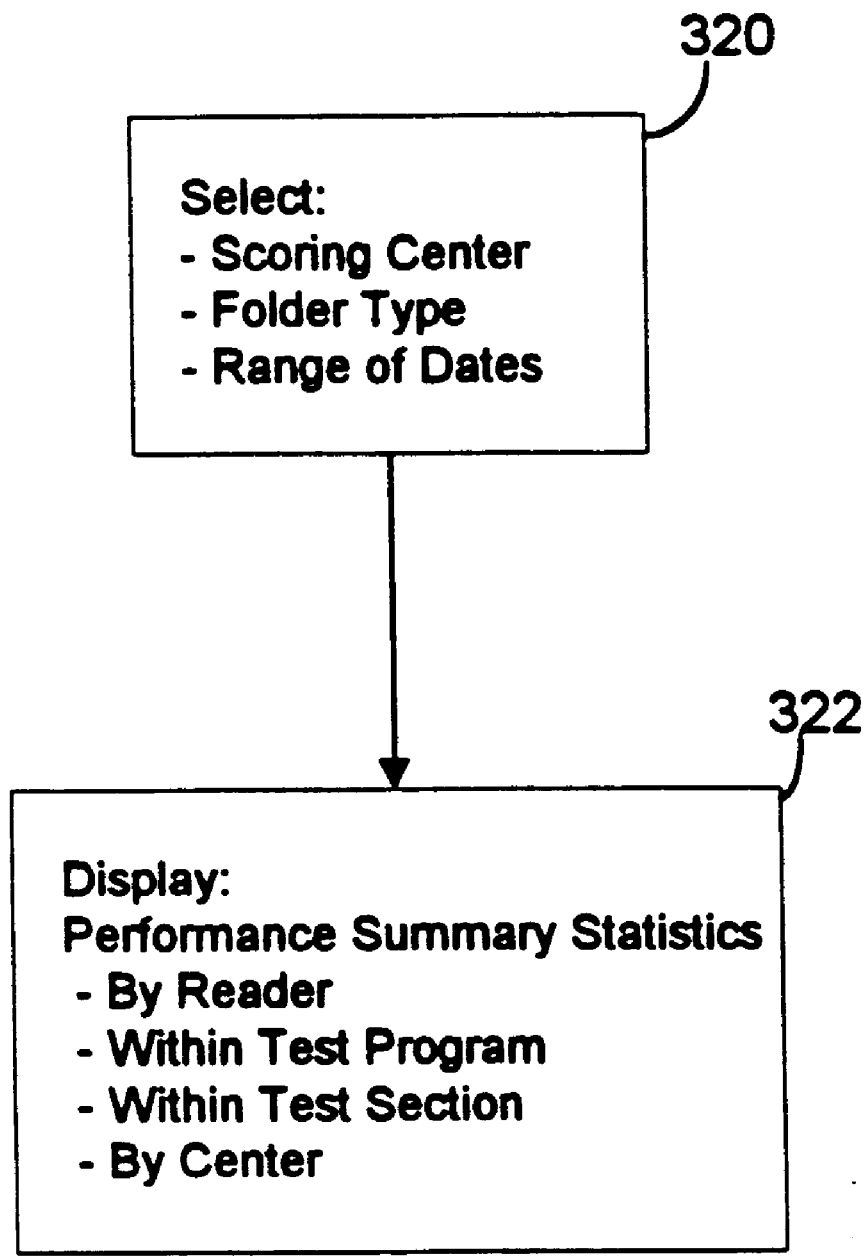
FIG. 22 is flow diagram of the process used to generate a scoring center rater performance summary report such as that shown in FIG. 23 using the present system.

FIG. 22 provides a flow diagram depicting a process for producing a scoring center performance summary report of raters such as that shown in FIG. 21. As shown, the report is generated by selecting from the appropriate system screens at step 320, a scoring center, a folder type and a range of dates. In response to the user selection, at step 322 the system displays performance summary statistics for all raters within the test program, test section, and scoring center.

The network topics reports of the topic performance summary data provide the capability to review overall performance summary across scoring centers, (i.e. the data is combined for all scoring centers). An example of a network topics report is shown in FIG. 23. As shown, the network data are typically organized by testing program, test section, and topic. For each topic, the performance statistics for each rater are accumulated including: the total number of essays scored; the total number of essays with scores exactly equal to the score given by another rater; the percentage of total number of essays scored by the rater with scores exactly equal to the score given by another rater; the number of essays given scores adjacent to the scores given by another rater; the percentage of total number of essays scored by the rater with scores adjacent to the scores given by another rater; the number of essays given scores that are discrepant from the scores given by another; the percentage of total number of essays scored by the rater with scores discrepant from those scores given by another; and the percentage score distribution.

Figure 24:
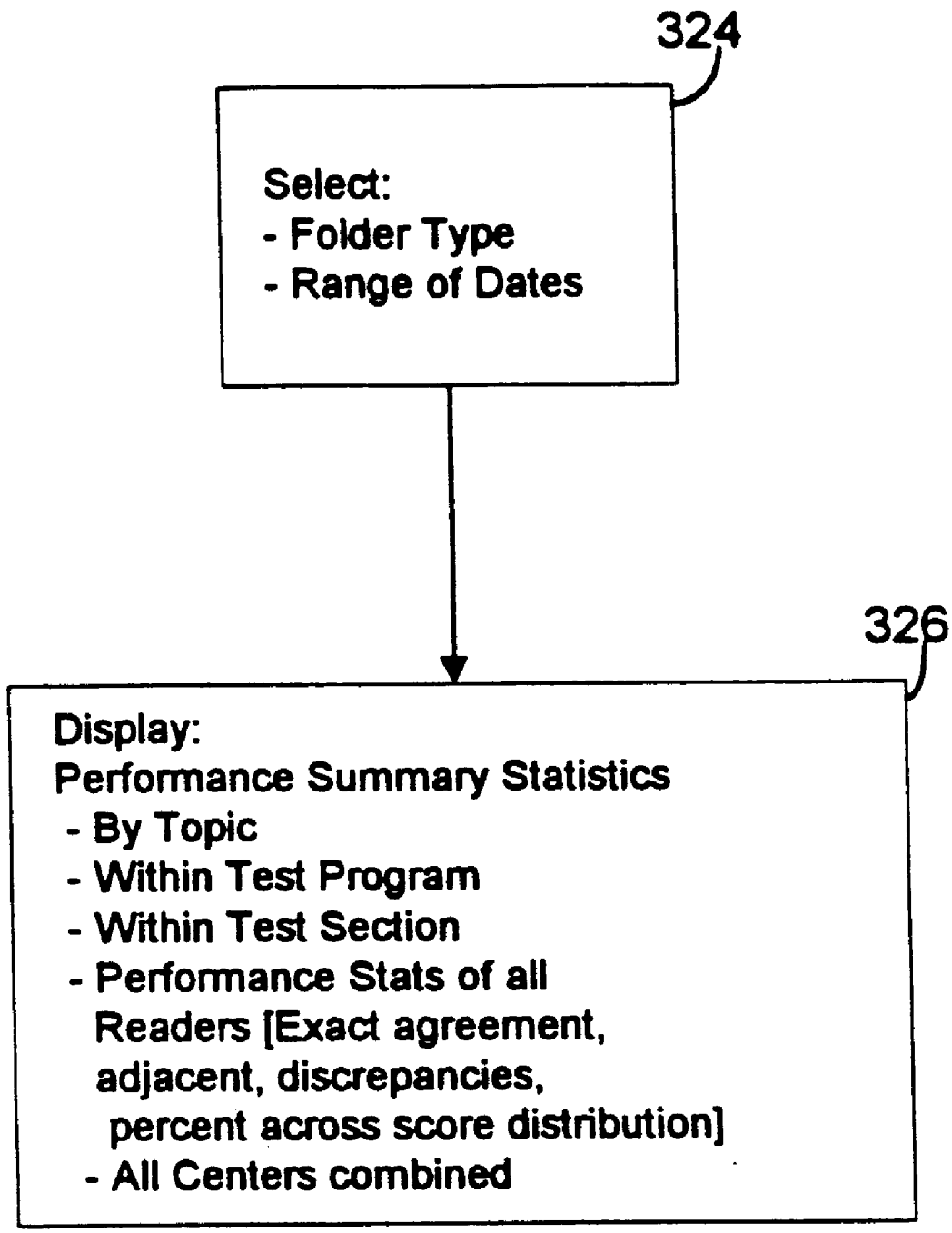
FIG. 24 is flow diagram of the process used to generate a network topic performance summary report such as that shown in FIG. 25 using the present system.

As shown in FIG. 24, the topics report is generated by selecting from the appropriate system screens at step 324, a folder type and a range of dates. At step 326, the system displays rater performance summary statistics by topic, test section, and test program.

The scoring center data reports of the topic performance monitoring functionality provide the capability to review the performance summary for all topics scored for a selected workfolder type for each scoring center that is active during a specific date range. As opposed to the previously described network performance data, the scoring center data is not combined but is broken out by scoring center. An example of a scoring center data report is shown in FIG. 25. The data are organized by scoring center, testing program, test section, and topic. The data include: the total number of essays scored; the total number of essays with scores exactly equal to the score given by another rater; the percentage of total number of essays scored by the rater with scores exactly equal to the score given by another rater; the number of essays given scores adjacent to the scores given by another rater; the percentage of total number of essays scored by the rater with scores adjacent to the scores given by another rater; the number of essays given scores that are discrepant from the scores given by another; the percentage of total number of essays scored by the rater with scores discrepant from those scores given by another; and the percentage score distribution.

Figure 26:
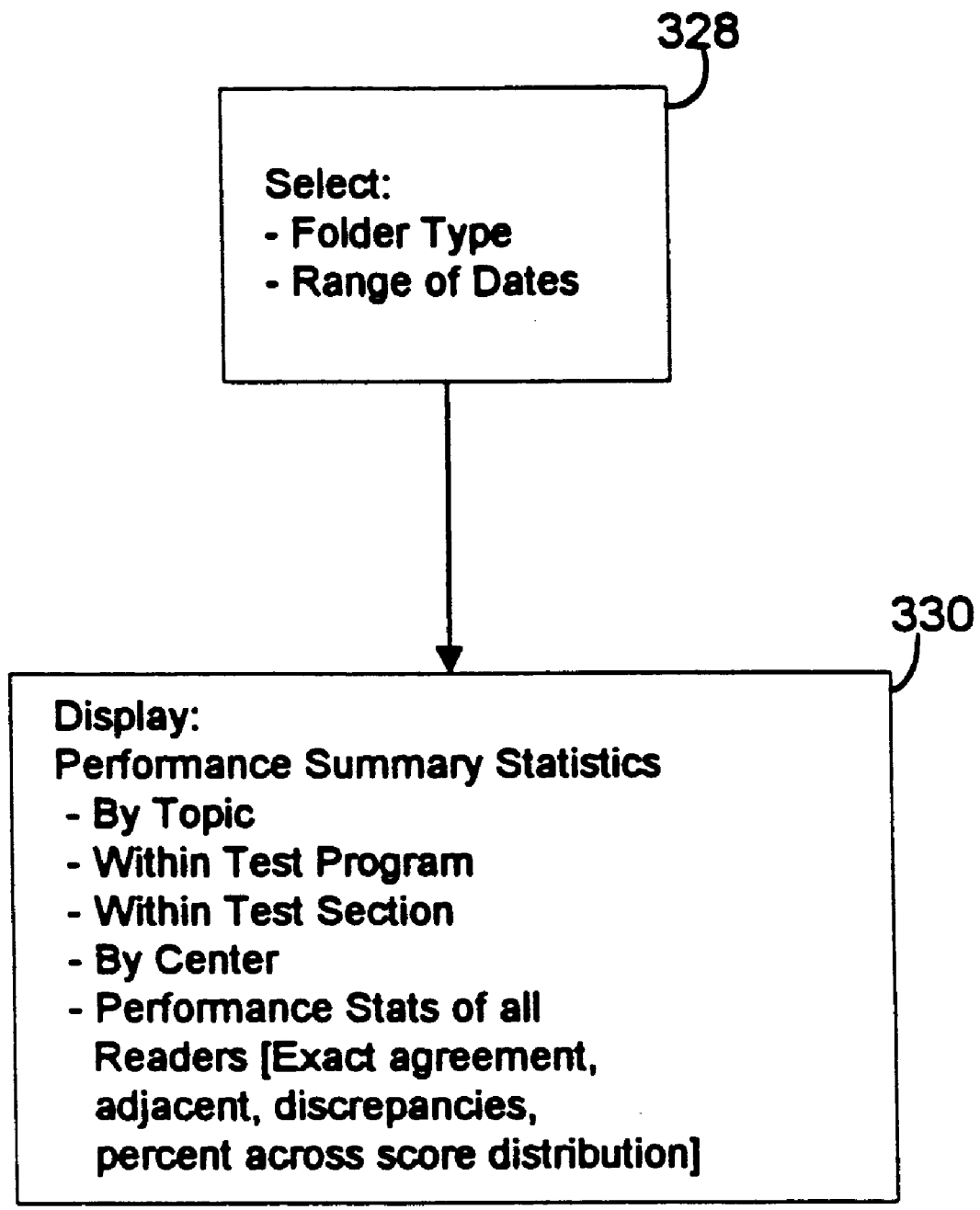
FIG. 26 is flow diagram of the process used to generate a scoring center topics performance summary report such as that shown in FIG. 27 using the present system.

FIG. 26 provides a flow for the process of generating a scoring center data report using the system of the invention. As shown in FIG. 26, this report is generated by selecting from the appropriate system screens at step 328, a folder type and a range of dates. At step 330, the system displays rater performance summary statistics by topic, test section, and test program.

Figure 27:
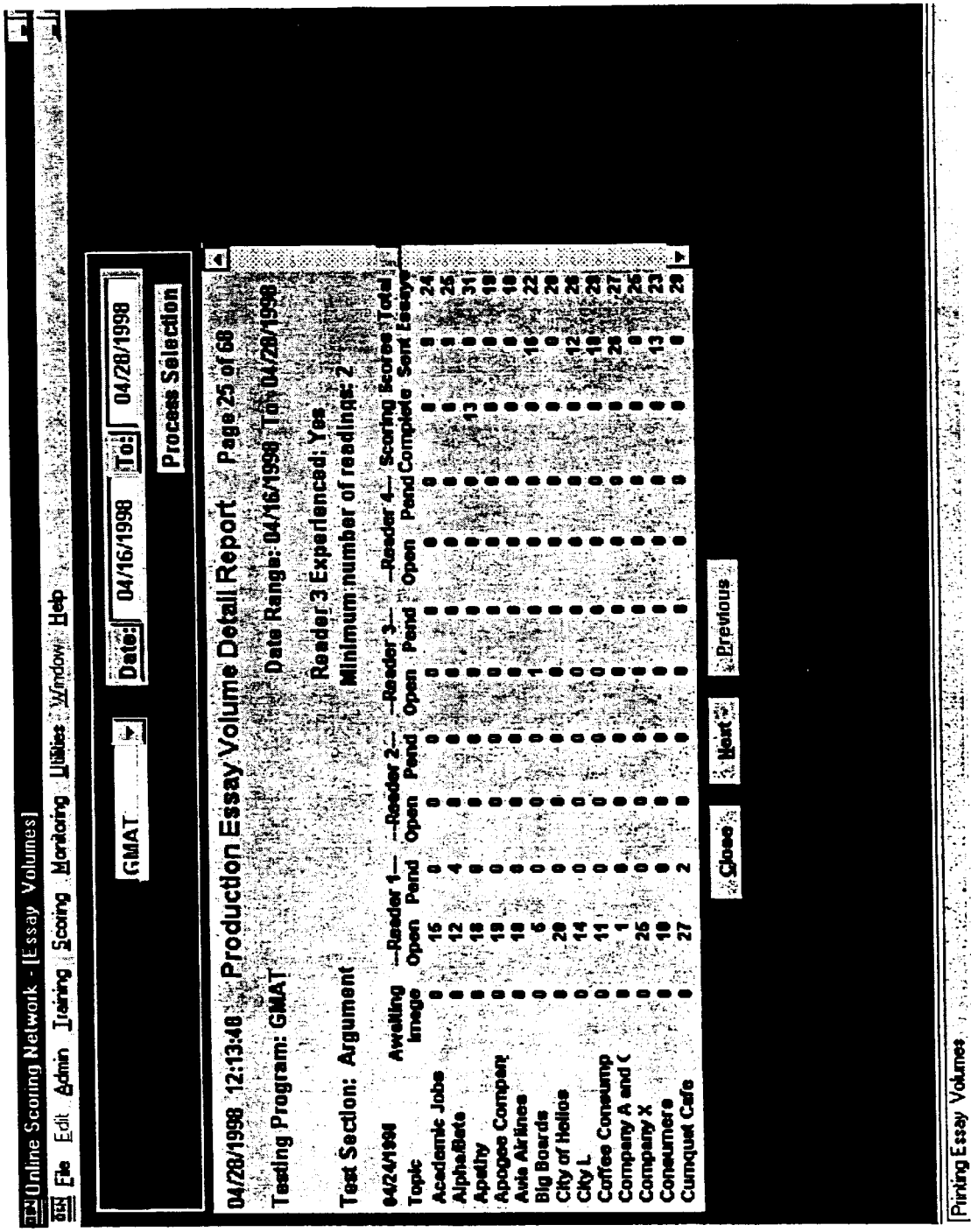
FIG. 27 is an example of an essay volume summary report generated using the present system.

Essay volume reports provide statistics regarding the volume of essays which have been or still need to be scored. FIG. 27 is an example of an essay volume summary report generated using the system monitoring functionality. Reports produced regarding the volume of essays scored can be generated for a particular testing program and a specified date range. The data are organized by testing program, test section, test date, and topic. For each topic, the data include the number of open and pending essays, the number of essays scored, the number of essays for which scores have been sent, and the total number of essays.

Candidate sample reports provide statistics on the volume of candidate samples which have been or still need to be scored. FIG. 28 is an example of a candidate sample summary report generated using the system monitoring functionality. Reports generated for a particular candidate sample provide data broken down by testing program and dates. The data are organized by testing program, test section, and topic. For each topic, the data include the number of open and pending candidate sample essays, the number of candidate sample essays designated as qualified, the number of candidate sample essays rejected, and the total number of candidate sample essays.

The data reported in either the essay volume or candidate sample volume report may also include: the minimum number of readings required for production essays for a testing program/test section; whether a rater must be an experienced rater for a testing program/test section; the number of essays for a topic that were handwritten by examinees and that must be scanned into the system before they can be scored online; whether an essay is awaiting assignment to a rater; an indication of whether an essay is in the process of being read by a rater; the number of production essays that have been read and scored by the required number of raters for a particular topic and test date; the number of production essays for which the scores have been sent to the testing program; the number of production essays that have been processed in the system for a particular topic and test date; the number of candidate sample essays that have been qualified by the system as sample essays for a particular topic and test date; the number of candidate sample essays that were rejected by the system because the scores awarded were different for that topic; and the total number of rejected and qualified candidate sample essays for a topic and test date in a test section.

It should be understood that the screen displays shown in the figures are for exemplary purposes only to show how a rater may interact with the rater station to utilize the inventive features of the disclosed scoring system. While the invention has been described and illustrated with reference to specific embodiments, those skilled in the art will recognize that modifications and variations may be made without departing from the principles of the invention as described hereinabove. For example, the monitoring functionality reports could be formatted differently than described above.

What is claimed is:

1. A workfolder creation and distribution system for use in a computer test scoring system having at least one rater station at which constructed responses to test questions are displayed for an authorized rater and where said authorized rater awards a score to each of the constructed responses so displayed, each constructed response being associated with a predetermined topic, the workfolder creation and distribution system comprising:

a memory which stores the constructed responses in electronic form keyed to a test section associated therewith;

means for electronically grouping a plurality of the constructed responses in said memory into a production workfolder for evaluation of the plurality of constructed responses by the at least one rater; and workfolder transmission means for accessing the production workfolder and transmitting the plurality of constructed responses in said production workfolder to at least one rater station operable to display the constructed responses and operable to accept scores awarded by an authorized rater at said at least one rater station in response to the constructed responses so displayed, said workfolder transmission means transmitting the scores associated with the plurality of constructed responses to the memory for storage in association with the constructed responses in the production workfolder.

2. The system of claim 1, wherein a rater station is operable to display the plurality of constructed responses in any order selected by the authorized rater.

3. The system of claim 1, wherein the grouping means provides a workfolder summary including a list of the constructed responses in the workfolder along with the score assigned thereto and allows the rater to select and redisplay any of the listed constructed responses for further scoring.

4. The system of claim 1, wherein the workfolder transmission means transmits the scores in response to a commit signal generated by the rater station after the authorized rater has completed the scoring of each of the plurality of constructed responses, the rater station being operable to display and redisplay any of the plurality of constructed responses and to accept and to replace scores awarded by the authorized rater prior to the generation of said commit signal.

5. The system of claim 1, wherein the grouping means further electronically groups constructed responses into at least one of the following: calibration workfolders for training new raters in applying scoring guidelines and certification workfolders for testing trainee raters.

6. The system of claim 1, wherein a common test section is associated with each of the plurality of constructed responses.

7. The system of claim 5, further comprising:
a constructed response classification means for selecting some of the constructed responses and defining the same as calibration constructed responses and for selecting some of the other constructed responses and defining the same as certification constructed responses, each said calibration constructed responses and each said certification constructed responses being stored in the memory in association with one of the predetermined topics, the grouping means further electronically grouping, based on the topics associated therewith, a plurality of said calibration constructed responses into a calibration workfolder and a plurality of said certification constructed responses into a certification workfolder.

8. The system of claim 1, further comprising:
a constructed response classification means for selecting some of the constructed responses and defining the same as monitoring constructed responses, each monitoring constructed response being stored in the memory in association with one of the predetermined topics, the grouping means electronically including, based on the topics associated therewith, a number of the monitoring constructed responses into the production workfolder.

9. The system of claim 8, wherein the number of monitoring constructed responses included in the production workfolder is preselected.

10. The system of claim 1, wherein the memory stores qualification information electronically related to a rater identification code, said qualification information being indicative of related rater's status as trainee, certified rater, experienced rater, or scoring leader.

11. The system of claim 10, wherein the qualification information is defined for a number of test sections for each authorized rater such that at least one authorized rater is qualified to score more than one test section, wherein the qualification information for said rater is test section independent.

12. The system of claim 11, further comprising:
a constructed response classification means for selecting some of the constructed responses and defining the same as calibration constructed responses and for selecting some of the other constructed responses and defining the same as certification constructed responses, each said calibration constructed response and each said certification constructed response being stored in the memory in association with one of the predetermined topics, the grouping means further electronically grouping, based on the topics associated therewith, a plurality of said calibration constructed responses into a calibration workfolder and a plurality of said certification constructed responses into a certification workfolder, the workfolder transmission means being enabled to transmit calibration workfolders and certification workfolders to rater stations at which the authorized rater status is trainee and calibration workfolders and production workfolders to rater stations at which the authorized rater status is experienced or certified.

13. The system of claim 12, wherein the constructed response classification means is additionally operable for selecting some other of the constructed responses and defining the same as benchmark constructed responses and for selecting others of the constructed responses and defining the same as rangefinder constructed responses, each benchmark constructed response and each rangefinder constructed response being stored in the memory in association with one of the predetermined topics, said workfolder transmission means transmitting said benchmark constructed responses and said rangefinder constructed responses to the rater station where said benchmark constructed responses and said rangefinder constructed responses are displayed upon a request initiated by the authorized rater.

14. The system of claim 11, wherein the grouping means includes each constructed response in at least two different production workfolder and transmits each different production workfolder to a different rater station with a different authorized rater, the grouping means comparing scores awarded to the same constructed response by different raters to determine whether said constructed response requires adjudication, and if so, defining said constructed response as an adjudication constructed response, the grouping means electronically grouping a plurality of adjudication constructed responses, based on the topics associated with said constructed responses, into an adjudication workfolder, the workfolder transmission means being enabled to transmit production workfolders and adjudication workfolders to adjudicators and adjudication workfolders to scoring leaders.

15. The system of claim 1 wherein the authorized rater is one of the following: a trainee having access only to training materials and calibration and certification workfolders, an experienced or certified rater having successfully completed training and having access to read and score production constructed responses; and a scoring leader having responsibility for training, assisting, and monitoring.

16. In a computer test scoring system comprising at least one rater station at which constructed responses to test questions are displayed to an authorized rater and at which the authorized rater awards a score in response to constructed responses so displayed, a method for selecting and designating constructed responses for training and quality control, a method comprising the steps of:

electronically distributing one constructed response to at least two rater stations for scoring by at least two different authorized raters;

electronically comparing the scores awarded by the different raters, and if the scores satisfy predetermined criteria, defining the constructed response as a qualified sample constructed response; and classifying each qualified sample constructed response in one of a number of categories of constructed responses wherein said classification is determinative of how said qualified sample constructed response is used by the computer scoring system.

17. The method of claim 16, wherein the step of electronically distributing said one constructed response comprises the steps of:

electronically distributing said one constructed response to a first rater station and a second rater station whereby a first rater and a second rater award a first score and a second score, respectively, for said one constructed response; and electronically transmitting said one constructed response to a third rater station and a fourth rater station whereby a third rater and a fourth rater award a third score and a fourth score, respectively, for said one constructed response if a difference between the first score and the second score satisfies said predetermined criteria.

18. The method of claim 17, wherein the first rater and the second rater are located in different scoring centers.

19. The method of claim 17, wherein the third and fourth rater are designated as scoring leaders with responsibilities for training assisting, assigning, and monitoring the work of other raters.

20. The method of claim 19, wherein the third rater and fourth rater are located in different scoring centers from each other.

21. The method of claim 16, wherein the number of categories of constructed responses include calibration constructed responses for use in training of raters and practice for raters, training sample constructed responses for use in training raters, certification constructed responses for use in qualifying raters for scoring constructed responses associated with certain topics, monitoring constructed responses for use in monitoring the quality of the raters' scoring, benchmark constructed responses and rangefinder constructed responses for use in establishing criteria for particular scores awarded by the raters.

22. The method of claim 16, wherein the computer test scoring system comprises a classification station, and said classifying step includes the step of electronically transmitting said qualified sample constructed responses to the classification station for classification by an authorized individual.

23. The method of claim 22, said classifying step further comprising the steps of:

reviewing the qualified sample constructed responses at the classification station;

assigning one of the number of categories of constructed responses to said qualified sample constructed responses; and storing each said qualified sample constructed response so classified with the category assigned thereto in a data storage device accessed by the computer test scoring system during rater training and scoring.

24. A fully integrated computer test scoring system for use in training raters for scoring constructed responses to test questions for use in controlling the quality of the scoring by raters, the system comprising:

at least one rater station operative to display constructed responses for review by raters and operative to accept scores awarded by the raters in response to the constructed responses so displayed;

a data storage device which stores constructed responses and relationships between the constructed responses and raters;

a processor which accesses the data storage device and distributes the constructed responses to the at least one rater station based on the relationships between the constructed responses and the raters operating from the at least one rater station, wherein the raters are qualified based on level of expertise; and a number of classification stations interfaced with the processor and the data storage device for use in classifying some of the constructed responses, based on the scores awarded thereto, as one of a predetermined category of constructed responses, wherein said processing means distributes only certain categories of constructed responses to certain raters based on the raters' level of expertise.

25. The system of claim 24, wherein the predetermined categories of constructed responses include calibration constructed responses for use in training of raters and practice for raters, training sample constructed responses for use in training raters, certification constructed responses for use in qualifying raters for scoring constructed responses associated with certain topics, monitoring constructed responses for use in monitoring the quality of the raters' scoring, benchmark constructed responses and rangefinder constructed responses for use in establishing criteria for particular scores awarded by the raters.

26. The system of claim 25, wherein said rater stations are operative to allow raters to request for a test section at least one of a training sample constructed response, calibration constructed response, rangefinder constructed response, and benchmark constructed response.

27. The system of claim 24, wherein each constructed response is associated with a predetermined test section and wherein the raters are qualified by test section.

28. The system of claim 27, wherein the categories of constructed responses include calibration constructed responses and certification constructed responses, the processing means selecting certification constructed responses and calibration constructed responses to transmit to the rater station when the rater assigned to said rater station is a trainee.

29. The system of claim 27, wherein the categories of constructed responses include monitoring constructed responses having qualified scores associated therewith, the processing means selecting a number of monitoring constructed responses to be transmitted to the rater station when the rater assigned to said rater station is experienced or certified.

30. The system of claim 27, wherein the categories of constructed responses include benchmark constructed responses and rangefinder constructed responses having predetermined scores associated therewith, the processing means selecting benchmark constructed responses and rangefinder constructed responses to transmit to the rater station in response to a benchmark request and a rangefinder request from the rater station.

31. The system of claim 24, wherein each constructed response is associated with a predetermined topic, the system further comprising:
an electronic workfolder distribution means interfaced with the processor for grouping the constructed responses into workfolders based upon the test section associated with the constructed response and the category of the constructed response and for transmitting said workfolders to the rater stations.

32. A computer test scoring system for use in monitoring the quality and performance of scoring of constructed responses to test questions by a plurality of raters evaluating particular test sections within tests, the system comprising:
means for storing in a production workfolder a plurality of constructed responses in an electronic workfolder for evaluation by a rater;
a number of rater stations, located at at least one scoring center, operative to display rater performance data, topic performance data for monitoring rater and topic performance across scoring centers, constructed response volume data, and candidate sample volume data;
a data storage device which stores constructed responses and related rater performance data, topic performance data, essay volume data, and candidate sample volume data; and
a processor which distributes rater performance data, topic performance data, constructed response volume data, and candidate sample volume data stored in the data storage device to the rater stations based on the relationships among the rater performance data, topic performance data, constructed response volume data, and candidate sample volume data and the raters operating from the respective rater stations, wherein the raters are qualified to view the data based on system status.

33. The system of claim 32, wherein the rater performance data comprise:
the total number of constructed responses scored by each rater; the total number of constructed responses for each rater with scores exactly equal to scores of another rater;
the total number of constructed responses for each rater with scores adjacent to scores of another rater;
the total number of constructed responses for each rater with scores discrepant to scores of another rater; and
the percentage distribution of awarded scores for each rater, wherein the data is compiled for transactions made by each rater during a given period of time and wherein the data is grouped by test section and test program.

34. The system of claim 33 wherein the rater performance data further comprise:
a beginning and ending date indicating a period on which is being reported;
a date on which the rater scored each essay;
a testing program identifier indicating the testing program for which each constructed response is being scored;
an item code uniquely identifying a specific test section to which the constructed response belongs;
an item name identifying the test section; and
a folder number identifying a specific workfolder in which the constructed response is stored.

35. The system of claim 32 wherein the topic performance data comprise:
scoring center rater data which provide the capability to review rater performance at a particular scoring center;
network topics data which provide the capability to review overall performance summary across scoring centers for all topics scored for a selected workfolder type; and
scoring center topics data which provide the capability to review the performance summary for all topics scored for a selected workfolder type for each scoring center that is active during a specific date range.

36. The system of claim 35 wherein the scoring center rater data comprises:
the total number of constructed responses scored by each rater;
the total number of constructed responses scored by each rater with scores exactly equal to scores of another rater,
the total number of constructed responses scored by each rater with scores adjacent to scores of another rater,
the total number of constructed responses scored by each rater with scores discrepant to scores of another rater; and
the percentage distribution of awarded scores for each rater, wherein the data is compiled for transactions occurring at a specific site during a specified time period and grouped by topic name, test section, and test program.

37. The system of claim 35, wherein the network topic data comprise:
the total number of constructed responses scored by each rater;
the total number of constructed responses scored by each rater with scores exactly equal to scores of another rater;
the total number of constructed responses scored by each rater with scores adjacent to scores of another rater;
the total number of constructed responses scored by each rater with scores discrepant to scores of another rater; and
the percentage distribution of awarded scores for each rater, wherein the data is compiled for transactions occurring across all scoring sites over a period of time and is grouped by topic, test section, test program, and scoring center.

38. The system of claim 35 wherein the topic performance data comprises:
the total number of constructed responses scored by each rater;
the total number of constructed responses scored by each rater with scores exactly equal to scores of another rater;
the total number of constructed responses scored by each rater with scores adjacent to scores of another rater;
the total number of constructed responses scored by each rater with scores discrepant to scores of another rater; and
the percentage distribution of awarded scores for each rater, wherein the data is compiled from transactions occurring across sites and grouped by topic, test section, and test program.

39. The system of claim 32 wherein the essay volume data for reporting on the volume of essays comprise:

the number of open and pending constructed responses for each topic;

the number of constructed responses scored for each topic;

the number of constructed responses for which scores have been sent for each topic; and the total number of constructed responses for each topic, wherein the data is compiled for transactions related to a particular testing program and occurring over a specified period of time and grouped by test program, test section, and topic.

40. The system of claim 39 wherein the constructed response volume data further comprise:

the minimum number of readings required for production constructed responses for a testing program and test section;

an indicator of whether a rater must be an experienced rater for a testing program and test section;

the number of constructed responses for a topic that were handwritten by examinees and that must be scanned into the system before they can be scored online;

an indicator of whether a constructed response is awaiting assignment to a rater;

an indicator of whether a constructed response is in the process of being read by a rater;

the number of production constructed responses that have been read and scored by the required number of raters for a particular topic and test date;

the number of production constructed responses for which scores have been sent to the testing program; and the number of production constructed responses that have been processed in the system for a particular topic and test date.

41. The system of claim 32 wherein the candidate sample volume statistics for reporting on the volume of candidate samples comprise:

the number of open candidate samples for each topic;

the number of pending candidate sample constructed responses for each topic;

the number of candidate sample constructed responses designated as qualified for each topic;

the number of candidate sample constructed responses rejected for each topic; and the total number of candidate sample constructed responses;

wherein data is compiled for transactions related to a particular testing program and occurring between a specified range of dates and the data is organized by test program, test section, and topic.

42. The system as recited in claim 41 wherein the candidate sample data further comprise:

the number of candidate sample constructed responses that have been qualified by the system as sample constructed responses for a particular topic and test date;

the number of candidate sample constructed responses that were rejected by the system because the scores awarded were different for that topic; and the total number of rejected and qualified candidate sample constructed responses for a topic and test date in a test section.

\* \* \* \* \*